(12) United States Patent
Ayabe et al.

(10) Patent No.: US 8,924,112 B2
(45) Date of Patent: Dec. 30, 2014

(54) START CONTROL DEVICE OF POWER TRANSMISSION SYSTEM FOR VEHICLE AND START CONTROL METHOD

(75) Inventors: Atsushi Ayabe, Toyota (JP); Tomohiro Asami, Nisshin (JP); Hidenori Saito, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 907 days.

(21) Appl. No.: 12/979,859

(22) Filed: Dec. 28, 2010

(65) Prior Publication Data

US 2011/0196590 A1    Aug. 11, 2011

(30) Foreign Application Priority Data

Feb. 5, 2010   (JP) .................................. 2010-024879

(51) Int. Cl.
*G06F 17/00* (2006.01)
*F16H 61/14* (2006.01)

(52) U.S. Cl.
CPC .......... *F16H 61/143* (2013.01); *F16H 2312/02* (2013.01); *F16H 2061/145* (2013.01)
USPC .................. 701/68; 701/51; 701/54; 701/64; 701/66; 701/67; 192/3.25; 192/3.3; 192/3.63; 475/65; 477/57; 477/79; 477/169; 477/180

(58) Field of Classification Search
None
See application file for complete search history.

(56) References Cited

U.S. PATENT DOCUMENTS

| 5,355,064 | A | * | 10/1994 | Yoshino et al. | ........... | 318/568.12 |
| 5,459,659 | A | * | 10/1995 | Takenaka | ..................... | 700/260 |
| 5,911,646 | A | * | 6/1999 | Tsutsui et al. | ................... | 477/93 |
| 6,503,169 | B2 | * | 1/2003 | Nakano et al. | ................... | 477/62 |
| 7,029,413 | B2 | * | 4/2006 | Sugawara et al. | ............. | 475/117 |
| 7,053,579 | B2 | * | 5/2006 | Moridaira | ................. | 318/568.12 |
| 7,072,740 | B2 | * | 7/2006 | Iribe et al. | ...................... | 700/245 |
| 7,074,148 | B2 | * | 7/2006 | Ishikawa et al. | ................ | 475/65 |
| 7,236,852 | B2 | * | 6/2007 | Moridaira et al. | ............ | 700/245 |
| 7,313,463 | B2 | * | 12/2007 | Herr et al. | ....................... | 700/245 |
| 7,328,094 | B2 | * | 2/2008 | Nagai et al. | ...................... | 701/51 |
| 7,393,305 | B2 | * | 7/2008 | Yamada et al. | ................ | 477/110 |
| 7,563,196 | B2 | * | 7/2009 | Yamada et al. | ................ | 477/110 |
| 7,657,345 | B2 | * | 2/2010 | Endo et al. | ..................... | 700/249 |
| 7,769,516 | B2 | * | 8/2010 | Kondo et al. | .................... | 701/66 |

(Continued)

FOREIGN PATENT DOCUMENTS

| JP | 2004-353750 | 12/2004 |
| JP | 2005-3193 | 1/2005 |

*Primary Examiner* — Jason Holloway
*Assistant Examiner* — Jonathan L Sample
(74) *Attorney, Agent, or Firm* — Oblon, Spivak, McClelland, Maier & Neustadt, L.L.P.

(57) ABSTRACT

A start control device and a start control method of a vehicular power transmission system including a lock-up clutch and a start clutch are provided in which start-time lock-up slip control is performed, and neutral control is performed. When the start-time lock-up slip control is additionally executed during cancellation of the neutral control, the gradient of an output rotational speed of the hydraulic power transmission which is changed, through engagement of the start clutch, toward an input rotational speed of the automatic transmission at the time of completion of engagement of the start clutch is controlled, using at least one of a start clutch pressure that is increased so as to engage the start clutch, and a lock-up clutch pressure that is increased so as to bring the lock-up clutch into slip engagement.

14 Claims, 13 Drawing Sheets

(56) References Cited

U.S. PATENT DOCUMENTS

| | | | |
|---|---|---|---|
| 7,949,428 B2* | 5/2011 | Endo et al. | 700/245 |
| 8,092,339 B2* | 1/2012 | Heap et al. | 477/5 |
| 8,392,076 B2* | 3/2013 | Kobayashi et al. | 701/51 |
| 8,417,382 B2* | 4/2013 | Yoshiike et al. | 700/253 |
| 2004/0176875 A1* | 9/2004 | Iribe et al. | 700/245 |
| 2004/0204290 A1* | 10/2004 | Ito | 477/175 |
| 2004/0229728 A1* | 11/2004 | Oshima et al. | 477/176 |
| 2004/0242359 A1* | 12/2004 | Sugawara et al. | 475/116 |
| 2005/0085340 A1* | 4/2005 | Ishikawa et al. | 477/41 |
| 2005/0113973 A1* | 5/2005 | Endo et al. | 700/245 |
| 2005/0222734 A1* | 10/2005 | Akaike | 701/51 |
| 2005/0245351 A1* | 11/2005 | Yamada et al. | 477/110 |
| 2006/0033462 A1* | 2/2006 | Moridaira | 318/568.12 |
| 2006/0237275 A1* | 10/2006 | Fujita et al. | 192/3.29 |
| 2007/0016329 A1* | 1/2007 | Herr et al. | 700/250 |
| 2007/0179017 A1* | 8/2007 | Yamada et al. | 477/107 |
| 2007/0220637 A1* | 9/2007 | Endo et al. | 901/2 |
| 2007/0270281 A1* | 11/2007 | Inoue et al. | 477/180 |
| 2008/0023285 A1* | 1/2008 | Tsunekawa | 192/3.3 |
| 2008/0076633 A1* | 3/2008 | Nagai et al. | 477/117 |
| 2008/0172161 A1* | 7/2008 | Kondo et al. | 701/66 |
| 2009/0118082 A1* | 5/2009 | Heap et al. | 477/5 |
| 2010/0204892 A1* | 8/2010 | Kobayashi et al. | 701/51 |
| 2010/0324699 A1* | 12/2010 | Herr et al. | 623/27 |
| 2011/0098152 A1* | 4/2011 | Sah et al. | 477/86 |
| 2012/0059518 A1* | 3/2012 | Lee et al. | 700/261 |

* cited by examiner

|  | C1 | C2 | B1 | B2 | B3 | F1 |
|---|---|---|---|---|---|---|
| 1ST | ○ |  |  | ◎ |  | △ |
| 2ND | ○ |  | ○ |  |  |  |
| 3RD | ○ |  |  |  | ○ |  |
| 4TH | ○ | ○ |  |  |  |  |
| 5TH |  | ○ |  |  | ○ |  |
| 6TH |  | ○ | ○ |  |  |  |
| R |  |  |  | ○ | ○ |  |
| N |  |  |  |  |  |  |

◎ ENGAGED WHEN ENGINE BRAKE IS APPLIED
△ ENGAGED IN DRIVE MODE

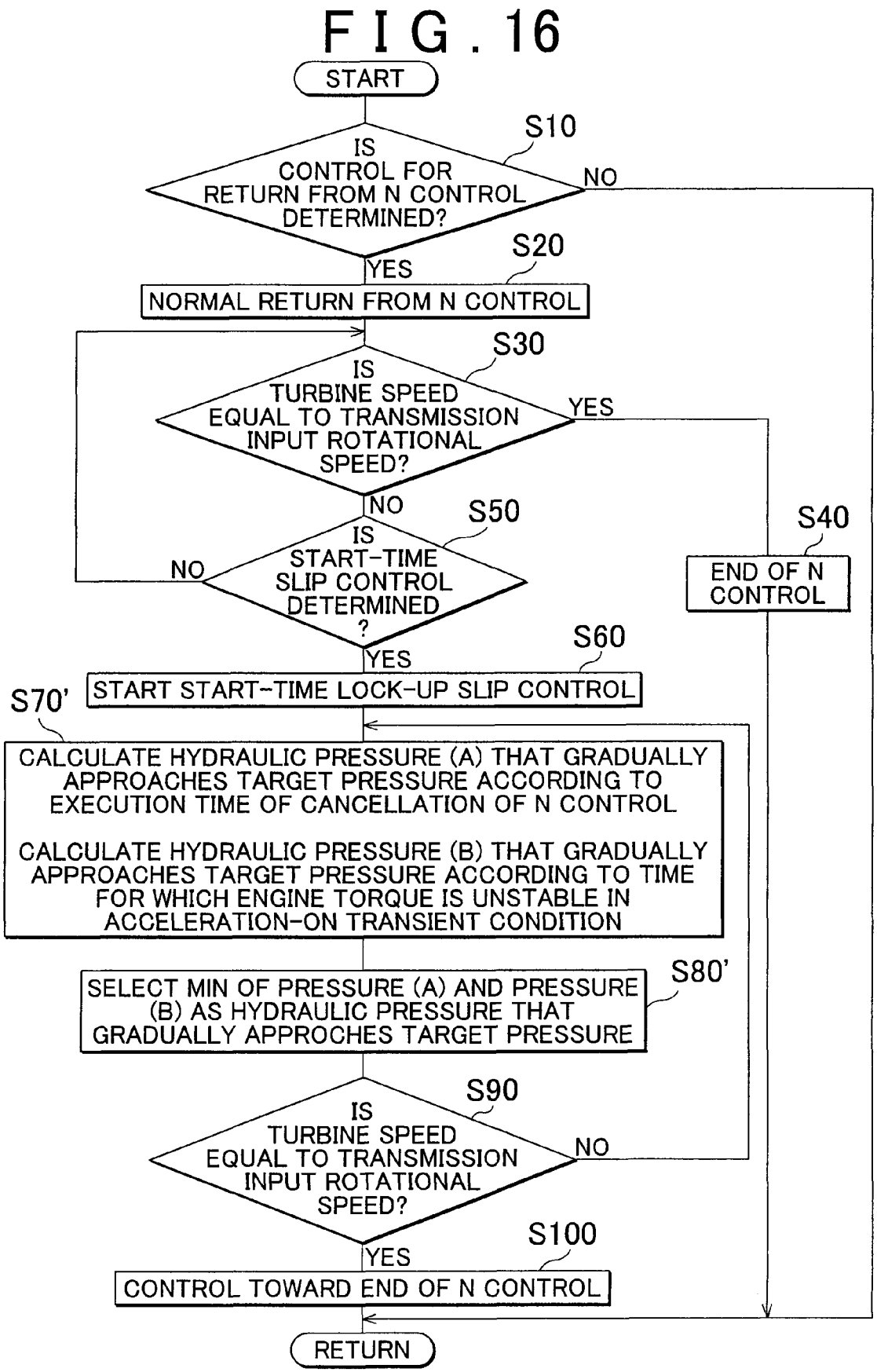

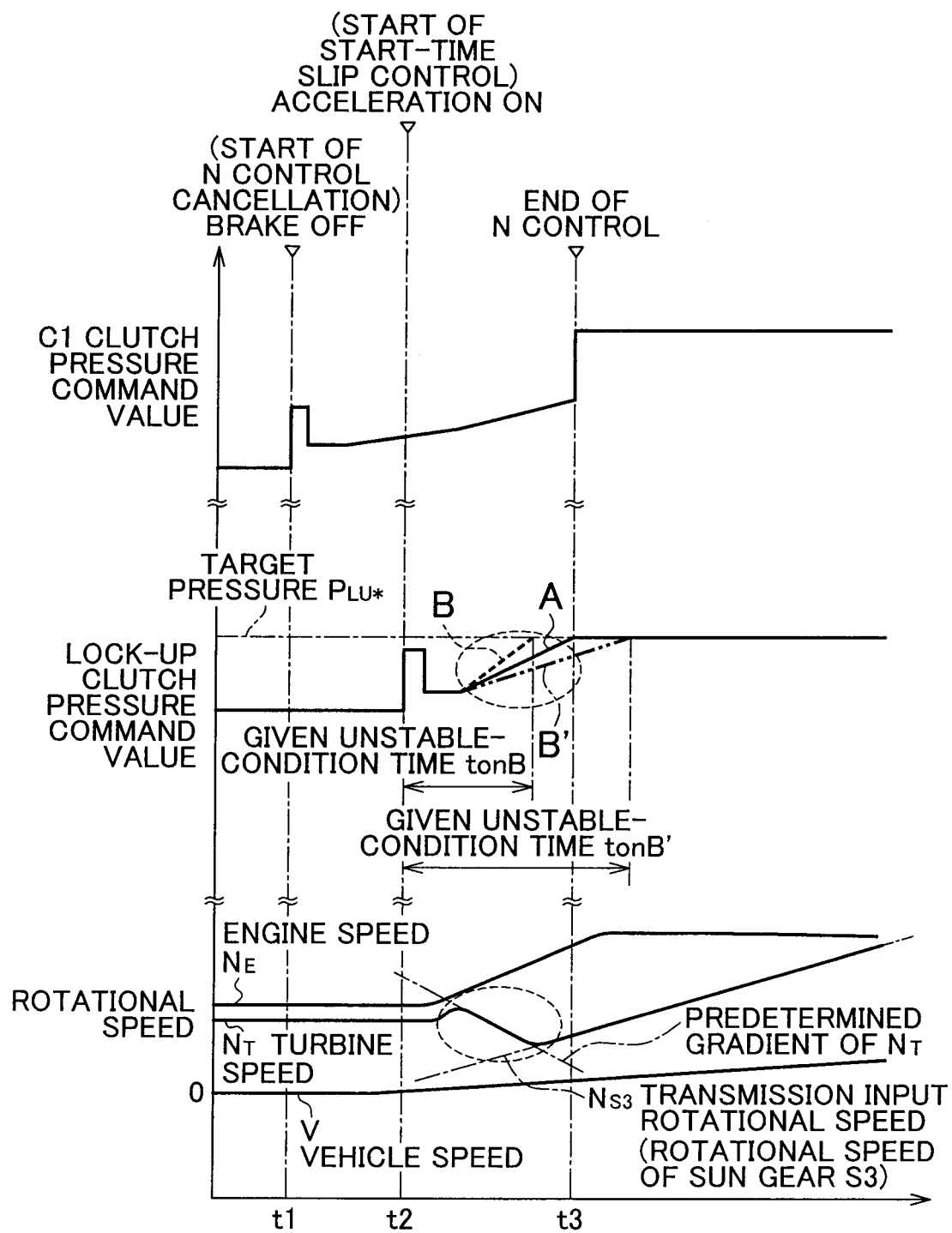

US 8,924,112 B2

START CONTROL DEVICE OF POWER TRANSMISSION SYSTEM FOR VEHICLE AND START CONTROL METHOD

INCORPORATION BY REFERENCE

The disclosure of Japanese Patent Application No. 2010-024879 filed on Feb. 5, 2010 including the specification, drawings and abstract is incorporated herein by reference in its entirety.

BACKGROUND OF THE INVENTION

1. Field of the Invention

The invention relates to a start control device of a vehicular power transmission system which performs neutral control (N control) and performs start-time lock-up slip control, and also relates to a start control method. The invention is particularly concerned with control executed when the neutral control is cancelled.

2. Description of the Related Art

In a known type of vehicle, neutral control is performed under which a start clutch is placed in a slipping or released state when the vehicle is stopped so as to bring a power transmission path between an engine and driving wheels into a restricted or interrupted power transmitting condition. Examples of this type of vehicle are described in Japanese Patent Application Publication No. 2005-3193 (JP-A-2005-3193) and Japanese Patent Application Publication No. 2004-353750 (JP-A-2004-353750). More specifically, in JP-A-2005-3193, when certain neutral control execution conditions, such as conditions that the vehicle is stopped with the shift lever placed in the D (running) position, the accelerator pedal is in an OFF (or released) state, and that the vehicle is on a flat road, are satisfied, neutral control for bringing a power transmission path in the automatic transmission into a substantially released or disconnected condition is performed so as to reduce the idling load of the engine and improve the fuel efficiency. Under the neutral control, a clutch (corresponding to a start clutch) for establishing the first-speed gear position of the automatic transmission is placed in a slipping or partially engaged state while the shift lever is kept in the "D" position, so as to substantially interrupt transmission of the engine power to the driving wheels. Then, when the neutral control is cancelled, namely, when the vehicle returns from the neutral control, the clutch is engaged so as to establish a start standby condition in which the vehicle is ready to start immediately.

In another known type of vehicle, start-time lock-up slip control is performed under which a lock-up clutch capable of directly coupling input and output members of a hydraulic power transmission (such as a torque converter or a fluid coupling) is brought into slip engagement when the vehicle is started, as described in JP-A-2005-3193, for example. Generally, under the start-time lock-up slip control, slip control (lock-up slip control, flexible lock-up control) is performed under which the lock-up clutch slips to a given extent upon starting of the vehicle following depression of the accelerator pedal (acceleration ON) to permit a lock-up operation, so as to suppress increase (or reduce the rate of increase) of the engine speed and improve the fuel efficiency, for example.

In the cancellation of the neutral control and the start-time lock-up slip control, both of which are controls for engaging clutches upon starting of the vehicle, the engagement of one of the clutches has an influence on the engagement of the other clutch, and therefore, the respective controls may not be carried out with stability. For example, when the neutral control is cancelled, the start clutch that is in the released state is controlled to be engaged from a point in time at which the brake pedal is released. At this time, in a transient engaging condition of the start clutch (i.e., while the start clutch is in the course of being engaged), the start clutch pressure is controlled based on, for example, the torque transmitted from the engine and the accelerator pedal stroke. If the start-time lock-up slip control is additionally executed during cancellation of the neutral control, the torque transmitted to the start clutch changes since the lock-up clutch is controlled to the apply side under the lock-up slip control. Therefore, the time it takes to complete cancellation of the neutral control may be prolonged if the clutch pressure of the start clutch is controlled to the originally set pressure, and the torque transmitted to the start clutch may be unexpectedly large, resulting in an increase of engagement shock.

When the cancellation of the neutral control is conducted solely (i.e., without involving the lock-up slip control), slipping of the torque converter is utilized so as to suppress (or absorb) shock (e.g., engagement shock or inertia shock) caused by engagement of the start clutch, and variations (fluctuations) in the engine torque that is not stabilized in a transient condition immediately after the accelerator pedal is depressed. In the start-time lock-up slip control, on the other hand, the looseness (slipping, released state) that accommodates a difference in the rotational speed between the input and output members of the hydraulic power transmission that transmits the power of the engine to the automatic transmission is suppressed or reduced due to half-engagement of the lock-up clutch, for example. Accordingly, if the start-time lock-up slip control is additionally executed during cancellation of the neutral control, the shock (torque variation) that occurs upon engagement of the start clutch, variations in the engine torque in the transient condition, etc. are more likely to be transmitted to the output side (namely, is more likely to be transmitted to the user (driver)), which may result in deterioration of the driveability. Therefore, it has been proposed to execute cancellation of neutral control and start-time lock-up slip control one after the other, for example, by starting the start-time lock-up slip control after completion of the neutral control, as described in JP-A-2005-3193.

In this connection, it is desirable, in view of the starting response, to cancel or finish the neutral control as soon as possible while suppressing shock caused by engagement of the start clutch, when the vehicle is started. It is also desirable to switch the lock-up clutch to the apply side at an earliest opportunity so as to improve the fuel efficiency. However, if the cancellation of the neutral control and the start-time lock-up slip control are executed one after the other so as to stably carry out these controls, an effect of improving the fuel efficiency due to the start-time lock-up slip control may be reduced, or the starting response may deteriorate, or shock caused by engagement of the start clutch may be increased. These problems have not been widely known, and it has not been proposed to stably and concurrently carry out control for engaging the start clutch for cancellation of the neutral control and control for engaging the lock-up clutch under the start-time lock-up slip control, so as to cancel the neutral control as soon as possible while suppressing shock, and engage the lock-up clutch as soon as possible for improvement in the fuel efficiency.

SUMMARY OF THE INVENTION

The invention has been developed in view of the above-described situation, and provides start control device and start control method of a vehicular power transmission system, with which cancellation of neutral control and start-time lock-up slip control can be stably carried out in an overlapping manner.

According to one aspect of the invention, a start control device of a power transmission system for a vehicle including a lock-up clutch capable of directly coupling input and output members of a hydraulic power transmission that transmits power of an engine to an automatic transmission, and a start clutch that transmits the power of the engine toward driving wheels when placed in an engaged state is provided. The start control device includes a controller that performs start-time lock-up slip control for bringing the lock-up clutch into slip engagement when the vehicle is started, and performs neutral control for placing the start clutch in a slipping state or a released state when the vehicle is stopped so as to bring a power transmission path between the engine and the driving wheels into a restricted power transmitting condition. When the start-time lock-up slip control is additionally executed during cancellation of the neutral control, the controller controls a gradient of an output rotational speed of the hydraulic power transmission which is changed, through engagement of the start clutch, toward an input rotational speed of the automatic transmission at the time of completion of engagement of the start clutch, using at least one of a start clutch pressure that is increased so as to engage the start clutch, and a lock-up clutch pressure that is increased so as to bring the lock-up clutch into slip engagement.

According to another aspect of the invention, a start control method of a power transmission system for a vehicle including a lock-up clutch capable of directly coupling input and output members of a hydraulic power transmission that transmits power of an engine to an automatic transmission, and a start clutch that transmits the power of the engine toward driving wheels when placed in an engaged state is provided. In the start control method, start-time lock-up slip control for bringing the lock-up clutch into slip engagement when the vehicle is started is performed, and neutral control for placing the start clutch in a slipping state or a released state when the vehicle is stopped so as to bring a power transmission path between the engine and the driving wheels into a restricted power transmitting condition is performed. When the start-time lock-up slip control is additionally executed during cancellation of the neutral control, a gradient of an output rotational speed of the hydraulic power transmission which is changed, through engagement of the start clutch, toward an input rotational speed of the automatic transmission at the time of completion of engagement of the start clutch is controlled, using at least one of a start clutch pressure that is increased so as to engage the start clutch, and a lock-up clutch pressure that is increased so as to bring the lock-up clutch into slip engagement.

According to the start control device and start control method as described above, when the start-time lock-up slip control is additionally executed during cancellation of the neutral control, the gradient of the output rotational speed of the hydraulic power transmission which is changed, through engagement of the start clutch, toward the input rotational speed of the automatic transmission at the time of completion of engagement of the start clutch is controlled, using at least one clutch pressure of the start clutch pressure that is increased so as to engage the start clutch, and the lock-up clutch pressure that is increased so as to bring the lock-up clutch into slip engagement. With this arrangement, the neutral control can be completed in a constantly stable period of time, and shock that occurs upon engagement of the start clutch, variations in the engine torque in a transient condition, etc. are less likely or unlikely to be transmitted to the output side (e.g., driving wheels). Thus, when the cancellation of neutral control and the start-time lock-tip slip control are executed in an overlapping manner, these controls can be performed with sufficiently high stability.

Preferably, the automatic transmission is in the form of, for example, one of various planetary gear type automatic transmissions having, for example, four forward speeds, five forward speeds, six forward speeds, or an even larger number of speeds, and including two or more planetary gear sets having rotating elements that are selectively coupled by engaging devices so as to establish a selected one of a plurality of gear positions (speeds), or a so-called belt-and-pulley type continuously variable transmission in which a transmission belt that functions as a power transmitting member is engaged with a pair of variable-diameter pulleys having variable effective diameters, and the speed ratio is continuously changed, or a so-called traction type continuously variable transmission having a pair of cones that are rotated about a common axis and a plurality of rollers that are rotatable about a center of rotation that intersects with the axis of the cones and are sandwiched under pressure between the pair of cones, wherein the angle at which the center of rotation of the rollers intersects with the axis of the cones is changed so as to make the speed ratio variable, or an automatic transmission installed on a so-called parallel type hybrid vehicle provided with an electric motor, which is able to transmit power to an engine or an output shaft, for example. Also, the manner of installing or mounting the automatic transmission on the vehicle may be of a transverse type as employed in a FF (front-engine, front-drive) vehicle, or the like, in which the axis of the automatic transmission is parallel with the width direction of the vehicle, or may be of a vertical type as employed in a FR (front-engine, rear-drive) vehicle, or the like, in which the axis of the automatic transmission is parallel with the longitudinal direction of the vehicle.

Preferably, in a vehicle having a planetary gear type automatic transmission, for example, neutral control is performed when the shift lever is in the "R" or "D" position, by placing all of the engaging devices in a slipping state or released state or placing any of the engaging devices to be engaged for establishing a gear position of the transmission in a slipping state or released state, so that a neutral condition of the automatic transmission is established in which the power transmission path in the automatic transmission is interrupted or disconnected. In a vehicle having a belt-and-pulley type continuously variable transmission or a traction-type continuously variable transmission, for example, neutral control is performed by placing an engaging device in a known forward-drive/reverse-drive switching device including engaging devices and gears, which is provided in a power transmission path between the engine and the driving wheels, in a slipping state or released state, so as to form a neutral condition of the power transmission path. The neutral control may also be performed by placing an engaging device provided in a power transmission path, other than engaging devices included in a planetary gear type automatic transmission or engaging devices included in a forward-drive/reverse-drive switching device, in a slipping state or released state, so as to establish a neutral condition of the automatic transmission.

Preferably, friction devices, such as multiple-disc or single-disc type clutches and brakes, which are engaged by hydraulic actuators are widely used as the above-mentioned engaging devices. An oil pump that supplies hydraulic oil for engaging the hydraulic friction devices may be driven by a driving power source for running the vehicle, thereby to deliver the hydraulic oil, or may be driven by a dedicated electric motor installed separately from the driving power source, for example. While it is desirable, in terms of the response, to design a hydraulic control circuit including the hydraulic friction devices so that output hydraulic pressures of linear solenoid valves as electromagnetic valves are directly supplied to hydraulic actuators (hydraulic cylinders) of the hydraulic friction devices, respectively, the hydraulic control circuit may be constructed so that a shift control valve is controlled using the output pressures of the linear solenoid valves as pilot pressures, and the hydraulic oil is supplied from the control valve to the hydraulic actuators. The linear solenoid valves are provided for respective ones of the plurality of hydraulic friction devices. However, if two or more of the linear solenoid valves are not engaged at the same time nor subjected to engaging/releasing control at the same time, a linear solenoid valve common to those friction devices may be provided. Thus, the hydraulic control circuit may be designed in various forms. Also, the hydraulic control of all of the hydraulic friction devices is not necessarily performed by the linear solenoid valves, but the hydraulic control of a part or all of the friction devices may be performed by pressure regulating devices other than the linear solenoid valves, for example, through duty control of an ON-OFF solenoid valve or valves.

Preferably, an internal combustion engine, such as a gasoline engine or a diesel engine, is widely used as the above-mentioned engine. Further, an electric motor, or the like, may be used as an auxiliary driving power source for running the vehicle, in addition to the engine.

In this specification, "supplying a hydraulic pressure" means "applying a hydraulic pressure" or "supplying hydraulic oil whose pressure is controlled to the hydraulic pressure".

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 16 is a flowchart corresponding the flowchart of FIG. 14, illustrating a control routine of a second embodiment executed by the electronic control unit of FIG. 3, for stably carrying out cancellation of neutral control and start-time lock-up slip control in an overlapping manner; and FIG. 17 is a time chart corresponding to the control routine of the second embodiment as shown in FIG. 16.

DETAILED DESCRIPTION OF EMBODIMENTS

Embodiments of the invention will be described in detail with reference to the drawings.

Figures 1, 2:
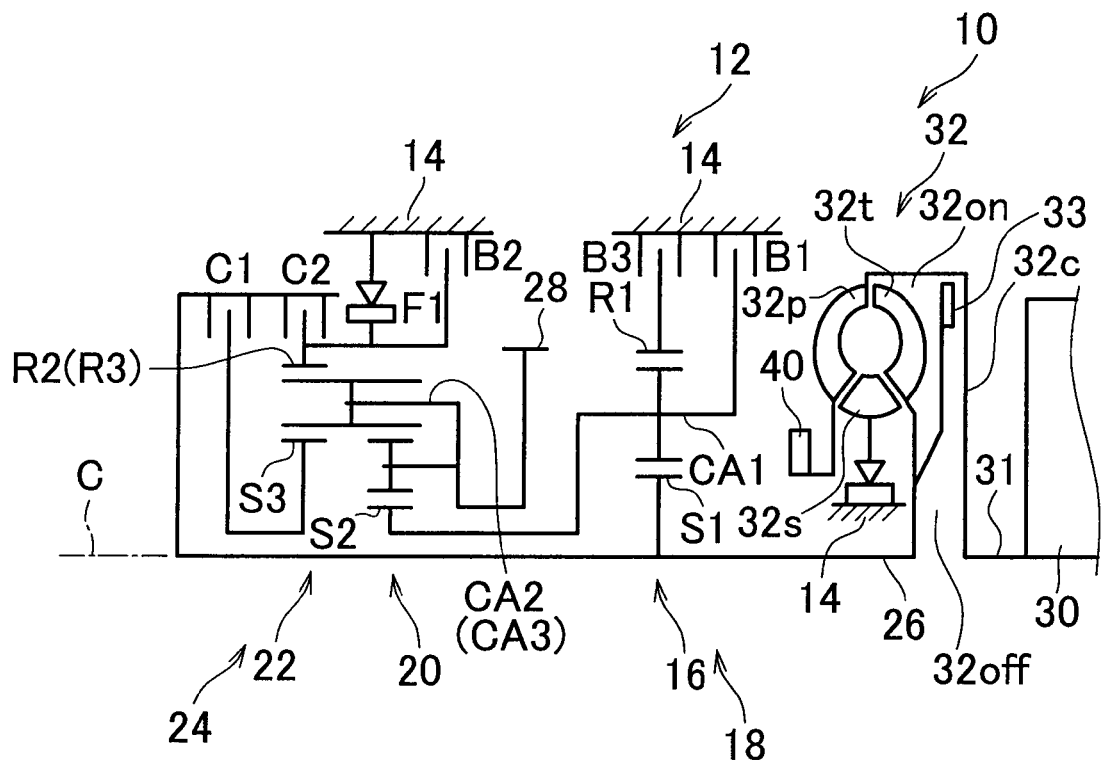
FIG. 1 is a skeleton diagram useful for explaining the construction of an automatic transmission provided in a vehicle to which the invention is applied.
FIG. 2 is an operation table indicating combinations of friction devices that are engaged or applied when establishing a plurality of gear positions of the automatic transmission of FIG. 1.
Figure 3:
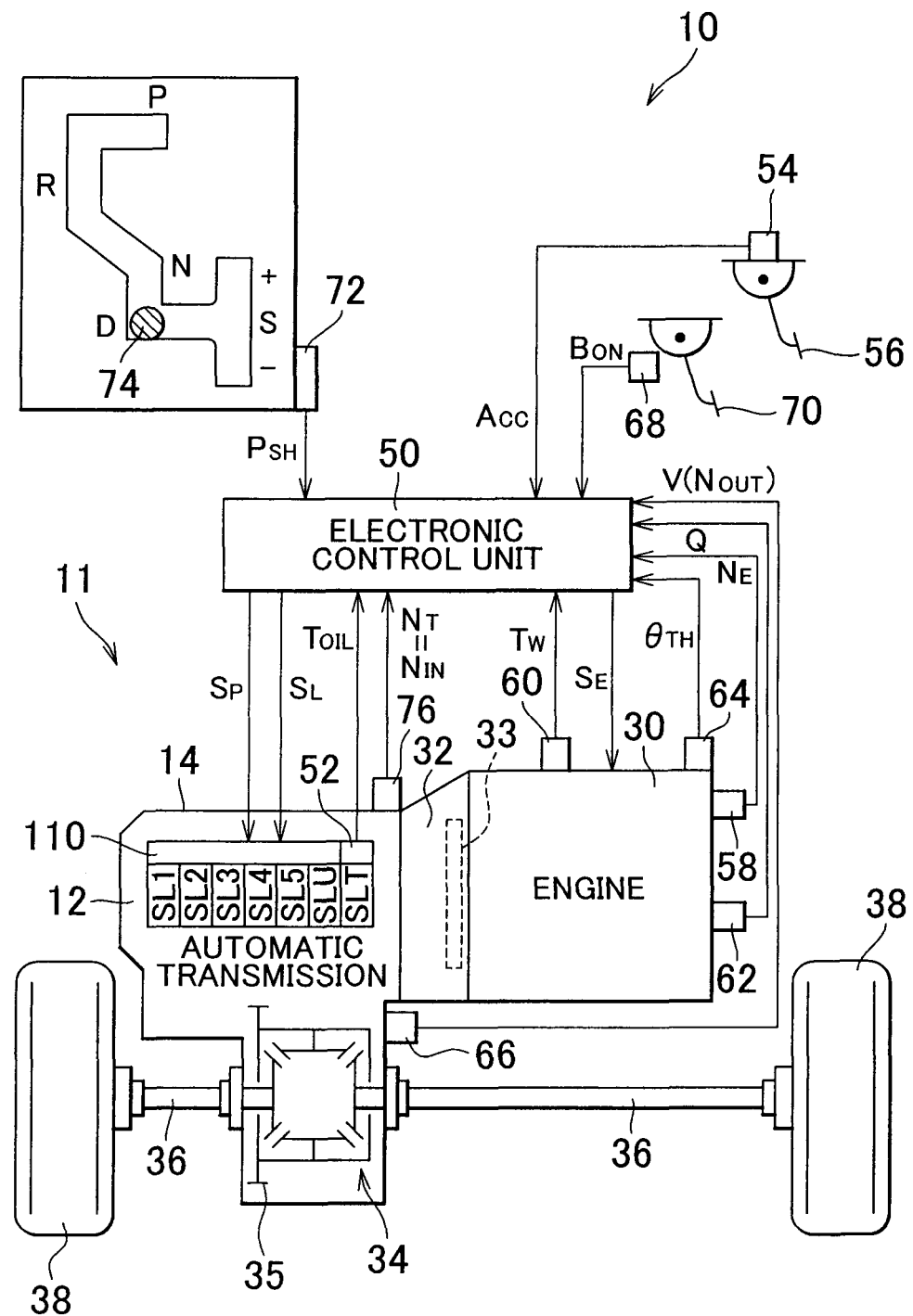
FIG. 3 is a block diagram illustrating principal parts of an electric control system provided in the vehicle for controlling the automatic transmission of FIG. 1, etc.

FIG. 1 is a skeleton diagram useful for explaining the construction of an automatic transmission 12 provided in a vehicle 10 to which the invention is applied. FIG. 2 is an operation table indicating operating states of friction devices that are selectively engaged or disengaged so as to establish a plurality of gear positions GS (speeds GS) of the automatic transmission 12. The automatic transmission 12 is favorably used in an FF vehicle in which the transmission 12 is installed in the lateral direction of the vehicle 10 (or transversely mounted). The automatic transmission 12 has a transaxle case 14 (hereinafter simply called "case 14") as a non-rotating member mounted on the vehicle body, and a first transmitting portion 18 and a second transmitting portion 24 of a Ravigneaux type, which are housed in the transaxle case 14. The first transmitting portion 18 that consists principally of a single pinion type first planetary gear set 16 and the second transmitting portion 24 that consists principally of a double pinion type second planetary gear set 20 and a single pinion type third planetary gear set 22 are disposed on a common axis C. The thus constructed automatic transmission 12 is operable to change the speed of rotation of an input shaft 26 and generate an output or power from an output gear 28. The input shaft 26 corresponds to an input rotating member of the automatic transmission 12. In this embodiment, the input shaft 26 is formed integrally with a turbine shaft of a torque converter 32 as a hydraulic power transmission that is rotated/driven by an engine 30 as a driving power source for running the vehicle. The output gear 28 corresponds to an output rotating member of the automatic transmission 12. In this embodiment, the output gear 28 functions as a counter drive gear that meshes with a counter driven gear to constitute a counter gear pair, such that the counter driven gear is mounted on the same shaft as a differential drive pinion that meshes with a differential ring gear 35 to constitute a final gear pair, so as to transmit power to a differential gear unit 34 as shown in FIG. 3, for example. With this arrangement, the output of the engine 30 is transmitted to right and left driving wheels 38, via a vehicular power transmitting system 11 including the torque converter 32, automatic transmission 12, differential gear unit 34, a pair of axles, and so forth (see FIG. 3). It is to be noted that the automatic transmission 12 and the torque converter 32 are constructed substantially symmetrically with respect to the center line (axis) C, and the lower halves of the automatic transmission 12 and torque converter 32 below the axis C are not illustrated in the skeleton diagram of FIG. 1.

The torque converter 32 includes a pump impeller 32p coupled to a crankshaft 31 of the engine 30, a turbine wheel 32t coupled to the automatic transmission 12 via the turbine shaft (corresponding to the input shaft 26) of the torque converter 32, and a stator wheel 32s that is inhibited by a one-way clutch from rotating in one direction. The torque converter 32 is operable to transmit power between the pump impeller 32p and the turbine wheel 32t via fluid. Namely, in the torque converter 32 of this embodiment, the pump impeller 32p corresponds to the input rotating member while the turbine wheel 32t corresponds to the output rotating member, and the power of the engine 30 is transmitted to the automatic transmission 12 via the fluid. Also, a lock-up clutch 33, which is provided between the pump impeller 32p and the turbine wheel 32t, is capable of directly coupling the pump impeller 32p and the turbine wheel 32t, i.e., the input and output rotating members of the torque converter 32. Also, a mechanical oil pump 40, which is coupled to the pump impeller 32p, is rotated/driven by the engine 30 so as to generate a hydraulic pressure as an original pressure for use in shift control of the automatic transmission 12, control of the operation of the lock-up clutch 33, and supply of lubricating oil to respective parts or components.

Figure 5:
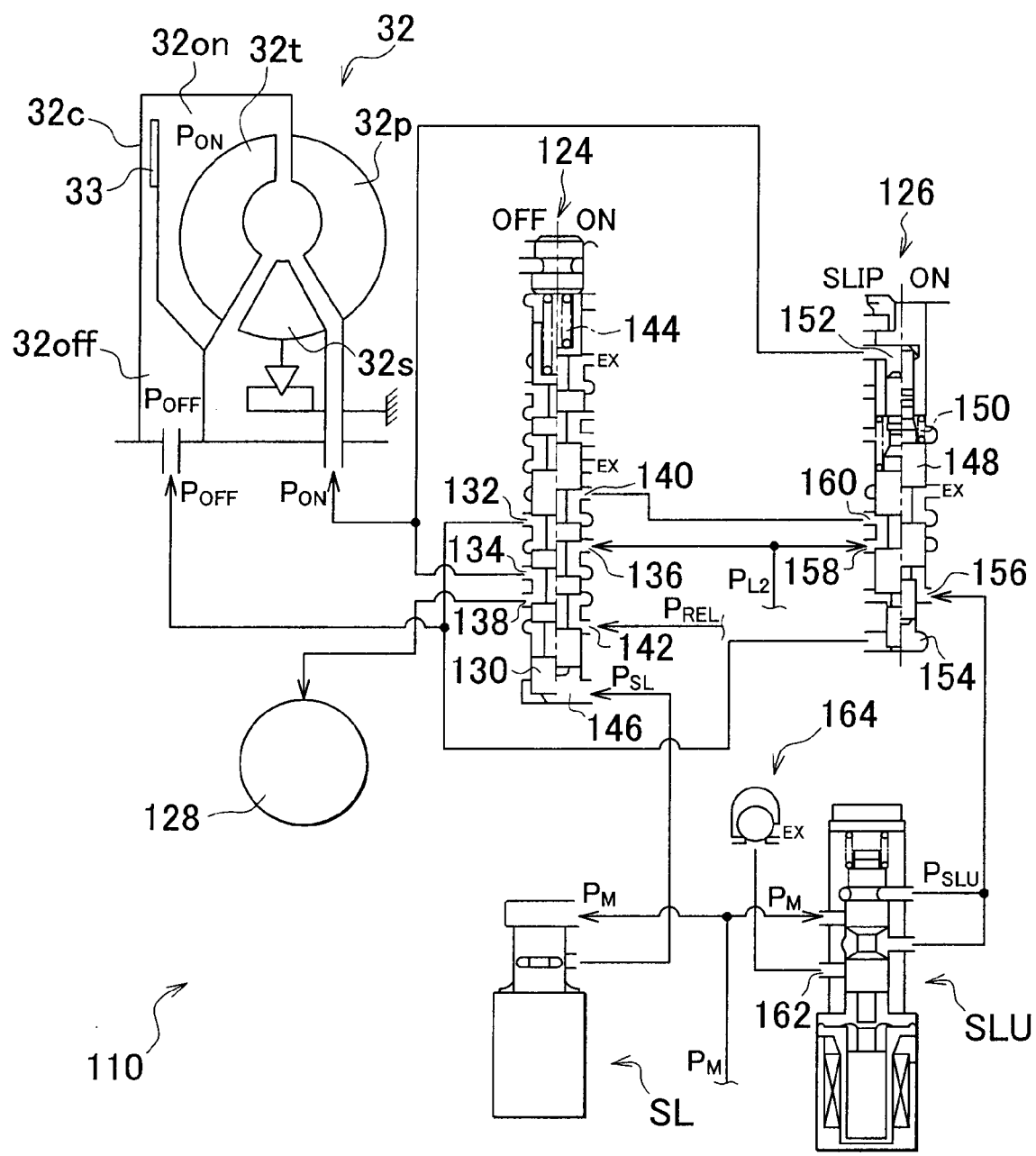
FIG. 5 is a circuit diagram concerning control of the operation of a lock-up clutch, as a part of the hydraulic control circuit of FIG. 3.

As well known in the art, the lock-up clutch 33 is a hydraulic friction clutch that is engaged by friction with a front cover 32c through control of a pressure difference $\Delta P$ $(=P_{ON}-P_{OFF})$ between an oil pressure $P_{ON}$ in an apply oil chamber 32on and an oil pressure $P_{OFF}$ in a release oil chamber 32off by means of a hydraulic control circuit 110 (see FIG. 5). In operation, the torque converter 32 is placed in one of broadly defined, three operating states, namely, a so-called lock-up release (lock-up OFF) state in which the pressure difference $\Delta P$ is set to a negative value and the lock-up clutch 33 is released, a so-called lock-up slipping state in which the pressure difference $\Delta P$ is made equal to or larger than zero and the lock-up clutch 33 is half-engaged while slipping, and a so-called lock-up state (engaged state, lock-up ON) in which the pressure difference $\Delta P$ is set to the maximum value and the lock-up clutch 33 is fully engaged. For example, when the lock-up clutch 33 is fully engaged (i.e., placed in the lock-up ON state), the pump impeller 32p and the turbine wheel 32t are rotated as a unit, and the power of the engine 30 is directly transmitted to the automatic transmission 12. When the pressure difference $\Delta P$ is controlled so that the lock-up clutch 33 is partially engaged while being in a certain slipping state, for example, when a difference $N_S$ between the input and output rotational speeds (i.e., the slip rotation speed (slip amount) =engine speed $N_E$–turbine speed $N_T$) is feedback-controlled, the turbine shaft is rotated following rotation of the crankshaft 31 with a given slip amount while the vehicle 10 is in a drive (power-on) mode, whereas the crankshaft 31 is rotated following rotation of the turbine shaft with a given slip amount while the vehicle 10 is in a driven (power-off) mode. If the pressure difference $\Delta P$ is made equal to zero while the lock-up clutch 33 is in a slipping state, no torque is transmitted via the lock-up clutch 33 (no torque is applied to the lock-up clutch 33), and the torque converter 32 operates under substantially the same conditions as that in the lock-up OFF state.

The automatic transmission 12 is placed in a selected one of six forward-drive gear positions (forward speeds), i.e., the first gear position "1st" through the sixth gear position "6th", and a reverse-drive gear position "R" (reverse speed), according to a combination of coupling states of selected ones of rotating elements (sun gears S1-S3, carriers CA1-CA3, and ring gears R1-R3) included in the first transmitting portion 18 and second transmitting portion 24. With regard to the forward-drive gear positions, for example, the first-speed gear position is established when the clutch C1 and the brake B2 are engaged, and the second-speed gear position is established when the clutch C1 and the brake B1 are engaged, while the third-speed gear position is established when the clutch C1 and the brake B3 are engaged, as shown in FIG. 2. The fourth-speed gear position is established when the clutch C1 and the clutch C2 are engaged, and the fifth-speed gear position is established when the clutch C2 and the brake B3 are engaged, while the sixth-speed gear position is established when the clutch C2 and the brake B1 are engaged. Also, the reverse-drive gear position is established when the brake B2 and the brake B3 are engaged. The automatic transmission 12 is brought into a neutral condition when all of the clutches C1, C2 and brakes B1-B3 are released.

The operation table of FIG. 2 indicates the relationship between each of the gear positions GS and the operating states of the clutches C1, C2, and brakes B1-B3. In FIG. 2, the single circle indicates that the friction device in question is engaged, and the double circuit indicates that the friction device in question is engaged only when an engine brake is applied. Since the one-way clutch F1 is provided in parallel with the brake B2 for establishing the first gear position "1st", the brake B2 need not be engaged when the vehicle is started (accelerated). Namely, it is sufficient to engage only the clutch C1 when the vehicle is started, and the clutch C1 is engaged at the time of a return from neutral control which will be described later. Thus, the clutch C1 functions as a start clutch. The speed ratio γGS (=the rotational speed $N_{IN}$ of the input shaft 26/the rotational speed $N_{OUT}$ of the output gear 28) of each gear position GS is determined by the respective gear ratios (=the number of teeth of the sun gear/the number of teeth of the ring gear) ρ1, ρ2, ρ3 of the first planetary gear set 16, second planetary gear set 20, and the third planetary gear set 22.

The above-mentioned clutches C1, C2 and brakes B1-B3 (which will be simply referred to as "clutch(es) C" and "brake (s) B" when not particularly distinguished) are hydraulic friction devices, such as multiple-disc clutches and brakes, which are engaged under control by hydraulic actuators so as to transmit power of the engine 30 toward the driving wheels 38. Through energization, de-energization and current control of linear solenoid valves SL1-SL5 (see FIG. 3 and FIG. 4) in the hydraulic control circuit 110, each of the clutches C and brakes B is switched between the engaged and released states, and a transient engaging pressures applied to the clutch C or brake B for engagement or release thereof is suitably controlled.

FIG. 3 is a block diagram illustrating principal parts of an electric control system provided in the vehicle 10 for controlling the engine 30, automatic transmission 12, and so forth. In FIG. 3, the vehicle 10 is provided with an electronic control unit 50 including a start control device associated with, for example, start-time lock-up slip control under which the lock-up clutch 33 is engaged while slipping when the vehicle starts, neutral control under which the clutch C1 is placed in a slipping state or released state when the vehicle is stopped so as to bring a power transmission path between the engine 30 and the driving wheels 38 into a restricted power transmission condition. The electronic control unit 50 includes a so-called microcomputer having, for example, CPU, RAM, ROM, and input and output interfaces, and the CPU performs various controls of the vehicle 10 by executing signal processing according to programs stored in the ROM in advance while utilizing the temporary storage function of the RAM. For example, the electronic control unit 50 performs output control of the engine 30, shift control of the automatic transmission 12, torque capacity control of the lock-up clutch 33, and so forth, and is divided as needed into an engine control unit for engine control, a hydraulic control device for shift control of the automatic transmission 12, a hydraulic control device for hydraulic control of the lock-up clutch 33, and so forth.

The electronic control unit 50 receives, for example, a signal indicative of the hydraulic oil temperature $T_{OIL}$ as the temperature of hydraulic oil (e.g., known ATF) in the hydraulic control circuit 110, which temperature is detected by a hydraulic oil temperature sensor 52, a signal indicative of the accelerator pedal stroke Acc as the operation amount of the accelerator pedal 56 representing the amount of driving force requested by the driver on the vehicle 10 and detected by an acceleration stroke sensor 54, a signal indicative of the engine speed $N_E$ as the rotational speed of the engine 30 detected by an engine speed sensor 58, a signal indicative of the coolant temperature $T_W$ of the engine 30 detected by a coolant temperature sensor 60, a signal indicative of the intake air amount Q of the engine 30 detected by an intake air amount sensor 62, and a signal indicative of the throttle opening $\theta_{TH}$ as the opening of an electronic throttle valve detected by a throttle position sensor 64. The electronic control unit 50 also receives, for example, a signal indicative of the output rotational speed $N_{OUT}$ as the rotational speed of the output gear 28 corresponding to the vehicle speed V and detected by a vehicle speed sensor 66, a signal indicative of the operation (brake ON) $B_{ON}$ of a foot brake pedal 80 indicating that a foot brake as a service brake is being applied (the foot brake pedal 80 is being depressed), which operation is detected by a brake switch 68, a signal indicative of the lever position (shift position) $P_{SH}$ of a shift lever 74 detected by a lever position sensor 72, and a signal indicative of the turbine speed $N_T$ (i.e., the input rotational speed $N_{IN}$ as the rotational speed of the input shaft 26) as the rotational speed of the turbine shaft of the torque converter 32.

Also, the electronic control unit 50 generates, as engine output command signals $S_E$ for output control of the engine 30, a drive signal to a throttle actuator for controlling opening/closing of the electronic throttle valve according to the accelerator pedal stroke Acc, an injection signal for controlling the amount of fuel injected from a fuel injection device or devices, an ignition timing signal for controlling the ignition timing of an injector or injectors in the engine 30, and so forth. Also, the electronic control unit 50 generates, as hydraulic control command signals $S_P$ for shift control of the automatic transmission 12, valve command signals (hydraulic pressure command signals, hydraulic pressure command values, drive signals) for controlling energization and de-energization of linear solenoid valves SL1-SL5 in the hydraulic control circuit 110 so as to establish a selected one of the gear positions GS of the automatic transmission 12, a hydraulic pressure command signal to a linear solenoid valve SLT for regulating a first line pressure $P_{L1}$, and so forth. Also, the electronic control unit 50 generates, as lock-up control command signals $S_L$ for controlling engagement, release, and slip amount $N_S$ ($=N_E-N_T$) of the lock-up clutch 33, hydraulic pressure command signals for driving a solenoid valve SL and a linear solenoid valve SLU (see FIG. 5) provided in the hydraulic control circuit 110, etc., to the hydraulic control circuit 110.

The shift lever 74 is mounted in the vicinity of the driver's seat, for example, and is adapted to be manually operated to a selected one of five lever positions "P", "R", "N", "D" and "S", as shown in FIG. 3.

The "P" position (range) is a parking position in which the power transmission path in the automatic transmission 12 is released or disconnected, namely, a neutral condition in which power transmission in the automatic transmission 12 is interrupted is established, and rotation of the output gear 28 is mechanically inhibited (the output gear 28 is locked) by a mechanical parking mechanism. The "R" position is a reverse running position for reversing the rotational direction of the output gear 28 of the automatic transmission 12. The "N" position is a neutral position for establishing a neutral condition in which power transmission in the automatic transmission 12 is interrupted. The "D" position is a forward running position in which automatic shift control is performed using all of the forward-drive gear positions, i.e., the first gear position "1st" through the sixth gear position "6th", over a shift range (D range) in which the automatic transmission 12 is allowed to be shifted up or down. The "S" position is a forward running position that permits manual shifting by switching among a plurality of types of shift ranges each having a limited range of change of the gear positions, namely, a plurality of types of shift ranges having different high-vehicle-speed gear positions.

The above-indicated "D" position is also a lever position for selecting an automatic shift mode as a control mode in which automatic shift control is performed within the range of the first-speed gear position to the sixth-speed gear position as shown in FIG. 2, over which range the automatic transmission 12 can be shifted up or down. The "S" position is also a lever position for selecting a manual shift mode as a control mode in which automatic shift control is performed within a range that does not exceed the highest-speed gear position of each shift range of the automatic transmission 12, and manual shift control is performed based on the shift range (i.e., the highest-speed gear position) changed by a manual operation of the shift lever 74.

While the highest-speed gear position or shift range is set (the shift range is fixed) when the shift lever 74 is operated to the "S" position in the above-described embodiment, the speed (or gear position) may be designated (the gear position may be fixed) based on the operation of the shift lever 74. In this case, shift control is performed so as to establish a desired gear position each time a manual shifting operation for achieving the gear position is performed on the automatic transmission 12.

Figure 4:
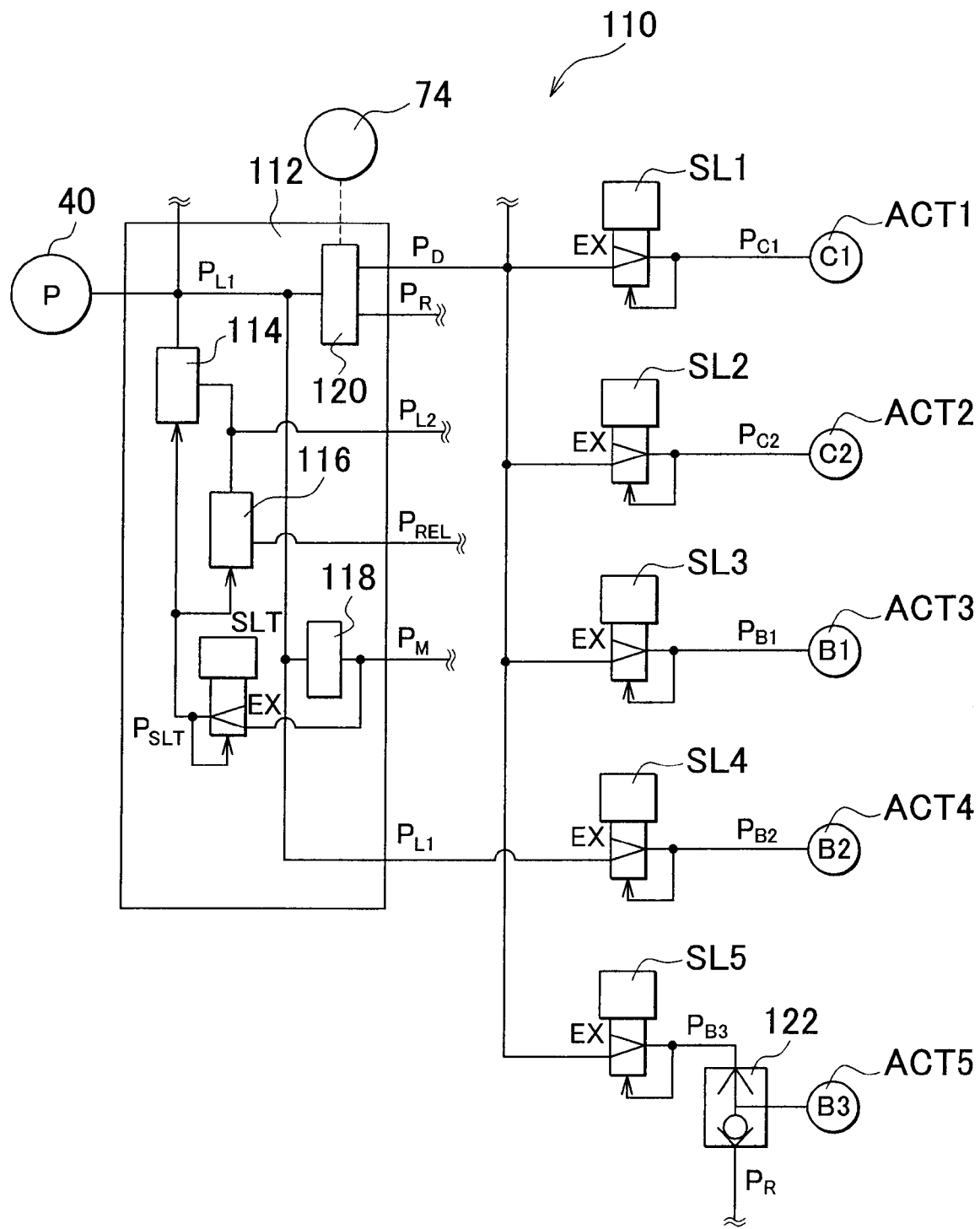
FIG. 4 is a circuit diagram concerning linear solenoid valves that control the operations of respective hydraulic actuators for clutches and brakes, as a part of the hydraulic control circuit of FIG. 3.

FIG. 4 shows a principal part of a hydraulic control circuit concerning linear solenoid valves SL1-SL5 for controlling the operations of respective hydraulic actuators (hydraulic cylinders) ACT1-ACT5 of the clutches C1, C2 and brakes B1-B3, as a part of the hydraulic control circuit 110. FIG. 5 shows a principal part of a hydraulic control circuit concerning control of the operation of the lock-up clutch 33, as a part of the hydraulic control circuit 110.

In FIG. 4, a hydraulic pressure supply device 112 includes a primary regulator valve (first regulating valve) 114 of a relief type, a secondary regulator valve (second regulating valve) 116, a linear solenoid valve SLT, and a modulator valve 118. The primary regulator valve 114 regulates an oil pressure generated from the mechanical oil pump 40 (see FIG. 1) that is rotated/driven by the engine 30, as an original pressure, into a first line pressure $P_{L1}$. The secondary regulator valve 116 regulates the oil pressure delivered from the primary regulator valve 114, as an original pressure, into a second line pressure $P_{L2}$. The linear solenoid valve SLT supplies a signal pressure $P_{SLT}$ to the primary regulator valve 114 and the secondary regulator valve 116 so as to produce the first line pressure $P_{L1}$ and the second line pressure $P_{L2}$ according to the engine load, etc. represented by, for example, the throttle opening $\theta_{TH}$ and the intake air amount Q. The modulator valve 118 regulates the first line pressure $P_{L1}$ as an original pressure into a modulator pressure $P_M$ as a fixed value. Also, the hydraulic pressure supply device 112 includes a manual valve 120 in which an oil path is mechanically or electrically switched based on the operation of the shift lever 74. For example, when the shift lever 74 is operated to the "D" position or "S" position, the manual valve 120 generates the received first line pressure $P_{L1}$ as a drive pressure $P_D$. When the shift lever 74 is operated to the "R" position, the manual valve 120 generates the received first line pressure $P_{L1}$ as a reverse pressure $P_R$. When the shift lever 74 is operated to the "P" position or "N" position, the manual valve 120 interrupts or inhibits output of the hydraulic pressure (i.e., leads the drive pressure $P_D$ and the reverse pressure $P_R$ to the drain side). Thus, the hydraulic pressure supply device 112 is arranged to generate the first line pressure $P_{L1}$, second line pressure $P_{L2}$, modulator pressure $P_M$, drive pressure $P_D$, and the reverse pressure $P_R$.

In the hydraulic control circuit 110, the linear solenoid valves SL1-SL5 (which will be referred to as "linear solenoid valves SL" when not particularly distinguished from one another) are respectively provided for the corresponding hydraulic actuators ACT1-ACT5. The drive pressure $P_D$ supplied from the hydraulic pressure supply device 112 to the respective linear solenoid valves SL1, SL2, SL3, SL5 is regulated into engaging pressures $P_{C1}$, $P_{C2}$, $P_{B1}$, $P_{B3}$, respectively, according to respective command signals from the electronic control unit 50, and the engaging pressures $P_{C1}$, $P_{C2}$, $P_{B1}$, $P_{B3}$ are directly supplied from the linear solenoid valves SL1, SL2, SL3, SL5 to the corresponding hydraulic actuators ACT1, ACT2, ACT3, ACT5. Also, the first line pressure $P_{L1}$ supplied from the hydraulic pressure supply device 112 to the linear solenoid valve SL4 is regulated into an engaging pressure $P_{B2}$ according to a command signal from the electronic control unit 50, and the engaging pressure $P_{B2}$ is directly supplied from the linear solenoid valve SL4 to the corresponding hydraulic actuator ACT4. To the hydraulic actuator ACT5 of the brake B3 is supplied, via a shuttle valve 122, a selected one of the engaging pressure $P_{B3}$ produced by the linear solenoid valve SL5 and the reverse pressure $P_R$.

The linear solenoid valves SL1-SL5, which basically have the same construction, are independently energized, de-energized and subjected to current control by the electronic control unit 50, so as to independently regulate the hydraulic pressures supplied to the respective hydraulic actuators ACT1-ACT5, namely, control the engaging pressures (clutch pressures) $P_{C1}$, $P_{C2}$ and engaging pressures (brake pressures) $P_{B1}$, $P_{B2}$, $P_{B3}$ of the clutches C1, C2 and brakes B1-B3, respectively. For example, the C1 clutch pressure $P_{C1}$ proportional to a drive current $I_{SL1}$ corresponding to a command value supplied from the electronic control unit 50 is generated from the linear solenoid valve SL1 to the clutch C1. Thus, the automatic transmission 12 is placed in each gear position GS with a predetermined one or ones of the engaging devices being engaged as indicated in the operation table of FIG. 2 by way of example. In the shift control of the automatic transmission 12, so-called clutch-to-clutch shifting is carried out by releasing a friction device as one of the clutches C and brakes B, which is to be released for the shifting, and applying another friction device that is to be engaged for the shifting. During the clutch-to-clutch shifting, the transient releasing pressure applied to the friction device to be released and the transient engaging pressure applied to the friction device to be engaged are appropriately controlled so as to accomplish the shifting as quickly as possible while suppressing shift shock. For upshifting from the third speed to the fourth speed, for example, the brake B3 is released and the clutch C2 is engaged, as indicated in the operation table of FIG. 2, such that the transient releasing pressure of the brake B3 and the transient engaging pressure of the clutch C2 are appropriately controlled so as to suppress shift shock.

In FIG. 5, the hydraulic control circuit 110 includes a switching solenoid valve SL that is operated to the ON/OFF position by the electronic control unit 50 so as to generate a switching signal pressure $P_{SL}$, a lock-up relay valve 124 for switching the lock-up clutch 33 between the released state and the engaged or slipping state, and a slip-control linear solenoid valve SLU that generates a signal pressure $P_{SLU}$ corresponding to a drive current $I_{SLU}$ supplied from the electronic control unit 50. The hydraulic control circuit 110 further includes a lock-up control valve 126 for controlling the slip amount $N_S$ of the lock-up clutch 33 or engaging the lock-up clutch 33 according to the signal pressure $P_{SLU}$ when the lock-up clutch 33 is engaged or placed in a slipping state by the lock-up relay valve 124 (namely, for switching the operating state of the lock-up clutch 33 over a range from the slipping state to the lock-up ON state), and an oil cooler 128 for cooling the hydraulic oil.

The lock-up relay valve 124 includes a spool valve 30 for switching connecting conditions, and is switched according to the switching signal pressure $P_{SL}$ between a release position (OFF position) for placing the lock-up clutch 33 in the released state and an apply position (ON position) for placing the lock-up clutch 33 in the engaged or slipping state. In FIG. 5, one half of the lock-up relay valve 124 on the left-hand side of the center line indicates a condition in which the spool valve 130 is placed in the OFF position in which the lock-up clutch 33 is in the released state, and the other half of the lock-up relay valve 124 on the right-hand side of the center line indicates a condition in which the spool valve 130 is placed in the ON position in which the lock-up clutch 33 is in the engaged or slipping state. More specifically, the lock-up relay valve 124 has a release port 132 that communicates with the release oil chamber 32off, an apply port 134 that communicates with the apply oil chamber 32 on, an input port 136 to which the second line pressure $P_{L2}$ is supplied, and an exhaust port 138 from which the hydraulic oil in the apply oil chamber 32 on is discharged when the lock-up clutch 33 is released and from which the hydraulic oil ($P_{REL}$) delivered from the secondary regulator valve 116 is discharged when the lock-up clutch 33 is engaged. The lock-up relay valve 124 further has a bypass port 140 from which the hydraulic oil in the release oil chamber 32off is discharged when the lock-up clutch 33 is engaged, a relief port 142 to which the hydraulic oil ($P_{REL}$) delivered from the secondary regulator valve 116 is supplied, a spring 144 that biases the spool valve 130 toward the OFF position, and an oil chamber 146 that receives, at an end face of the spool valve 130, the switching signal pressure $P_K$, from the switching solenoid valve SL.

The lock-up control valve 126 has a spool valve 148, a spring 150 that biases the spool valve 148 toward a SLIP position, an oil chamber 152 that receives the hydraulic pressure $P_{ON}$ in the apply oil chamber 32 on of the torque converter 32 so as to bias the spool valve 148 toward the SLIP position, and an oil chamber 154 that receives the hydraulic pressure $P_{OFF}$ in the release oil chamber 32off of the torque converter 32 so as to bias the spool valve 148 toward the full engagement (ON) position. The lock-up control valve 126 further has an oil chamber 156 to which the signal pressure $P_{SLU}$ is supplied from the slip-control linear solenoid valve SLU, an input port 158 to which the second line pressure $P_{L2}$ is supplied, and a control port 160 to which a hydraulic pressure is supplied from the bypass port 140 of the lock-up relay valve 124. In FIG. 5, one half of the lock-up control valve 126 on the left-hand side of the center line indicates a condition in which the spool valve 148 is placed in the SLIP position, and the other half on the right-hand side of the center line indicates a condition in which the spool valve 148 is placed in the full engagement (ON) position.

The slip-control linear solenoid valve SLU is arranged to generate a signal pressure $P_{SLU}$ for controlling the engaging pressure when the lock-up clutch 33 is engaged or engaged while slipping, according to a command from the electronic control unit 50. For example, the linear solenoid valve SLU is an electromagnetic control valve that reduces the modulator pressure $P_M$ as an original pressure, and generates the signal pressure $P_{SLU}$ proportional to a drive current (energizing current) $I_{SLU}$ corresponding to a command value supplied from the electronic control unit 50. The slip-control linear solenoid valve SLU has a drain port 162 that communicates with a check ball 16 so that the drain port 162 is normally closed by the check ball 164. If a pressure of a certain level or higher is applied to the check ball 164, the check ball 164 is moved to an open position, and the hydraulic oil is discharged from the drain port 162.

The switching solenoid valve SL generates a certain switching signal pressure $P_{SL}$ according to a command from the electronic control unit 50. For example, when the switching solenoid valve SL is in a non-energized state (OFF state), the switching signal pressure $P_{SL}$ is made equal to a drain pressure. When the solenoid valve SL is in an energized state (ON state), it applies the modulator pressure $P_M$ as the switching signal pressure $P_{SL}$ to the oil chamber 146, so that the spool valve 130 of the lock-up relay valve 124 is moved to the ON position as the apply position.

With the hydraulic control circuit 110 constructed as described above, supply of the hydraulic pressure to the apply oil chamber 32 on and the release oil chamber 32off is switched among different states or modes, and the operating state of the lock-up clutch 33 is switched or changed. Initially, the case where the lock-up clutch 33 is brought into a slipping state or lock-up ON state will be explained. In the lock-up relay valve 124, the switching signal pressure $P_{SL}$ is supplied from the switching solenoid valve SL to the oil chamber 146 and the spool valve 130 is moved toward the ON position, so that the second line pressure $P_{L2}$ supplied to the input port 136 is supplied from the apply port 134 to the apply oil chamber 32 on. At the same time, the release oil chamber 32off is brought into communication with the control port 160 of the lock-up control valve 126 via the release port 132 and the bypass port 140. Then, the oil pressure $P_{OFF}$ in the release oil chamber 32off is controlled by the lock-up control valve 126 (namely, the pressure difference $\Delta P$ ($=P_{ON}-P_{OFF}$) or engaging pressure is controlled by the lock-up control valve 126), so that the operating state of the lock-up clutch 33 is switched or changed within the range of the slipping state to the lock-up ON state.

More specifically, if the signal pressure $P_{au}$ for moving the spool valve 148 toward the full engagement (ON) position is not supplied to the oil chamber 156 in the lock-up control valve 126, and the spool valve 148 is placed in the SLIP position under the thrust of the spring 150, when the spool valve 130 of the lock-up relay valve 124 is moved toward the engagement (ON) position, namely, when the lock-up clutch 33 is switched to the engaged or slipping state, the second line pressure $P_{L2}$ supplied to the input port 158 is supplied from the control port 160 to the release oil chamber 32off, via the bypass port 140 and the release port 132 of the relay valve 124. The flow rate of the hydraulic oil delivered from the control port 160 is controlled by the signal pressure $P_{SLU}$ supplied to the oil chamber 156. Namely, when the spool valve 148 is in the SLIP position, the pressure difference $\Delta P$ is controlled by the signal pressure $P_{SLU}$ of the slip-control linear solenoid valve SLU, so that the slipping state of the lock-up clutch 33 is controlled.

If the signal pressure $P_{SLU}$ for moving the spool valve 148 toward the full engagement (ON) position is supplied to the oil chamber 156 in the lock-up control valve 126 while the spool valve 130 of the lock-up relay valve 124 is moved to the ON position, the second line pressure $P_{L2}$ is not supplied from the input port 158 toward the release oil chamber 32off, and the hydraulic oil from the release-side oil chamber 32off is drained via the drain port EX. As a result, the pressure difference $\Delta P$ is maximized, and the lock-up clutch 33 is brought into the fully engaged state. When the lock-up clutch 33 is in the slipping state or fully engaged state, the lock-up relay valve 124 is placed in the ON position; therefore, the relief port 142 and the discharge port 138 are brought into communication with each other. As a result, the hydraulic oil ($P_{REF}$) delivered from the secondary regulator valve 116 is supplied from the discharge port 138 to the oil cooler 128.

On the other hand, if the switching signal pressure $P_{SL}$ is not supplied to the oil chamber 146 of the lock-up relay valve 124, and the spool valve 130 is placed in the OFF position under the bias force of the spring 144, the second line pressure $P_{L2}$ supplied to the input port 136 is supplied from the release port 132 to the release oil chamber 32off. Then, the hydraulic oil discharged into the apply port 134 via the apply oil chamber 32 on is supplied from the discharge port 138 to the oil cooler 128 and cooled. Namely, in the condition where the spool valve 130 of the lock-up relay valve 124 is placed in the OFF position, the lock-up clutch 33 is placed in the released state, and slipping or engagement control is not performed via the slip-control linear solenoid valve SLU and the lock-up control valve 126. In other words, even in the case where the signal pressure $P_{SLU}$ generated from the slip-control linear solenoid valve SLU is changed, the change will not be reflected by the engaging state (pressure difference $\Delta P$) of the lock-up clutch 33 as long as the spool valve 130 of the lock-up relay valve 124 is placed in the OFF position. In this connection, the pressure difference $\Delta P$ controlled by the signal pressure $P_{SLU}$ of the slip-control linear solenoid valve SLU is a hydraulic pressure value representing the engaged or released state of the lock-up clutch 33, and is referred to as "lock-up clutch pressure $P_{LU}$" in this embodiment. The lock-up clutch pressure $P_{LU}$ is also a hydraulic pressure value corresponding to the slip amount $N_S$ or the torque capacity $T_C$ of the lock-up clutch 33. The signal pressure $P_{SLU}$ of the slip-control linear solenoid valve SLU is a hydraulic pressure command value of the lock-up clutch pressure $P_{LU}$.

Figure 6:
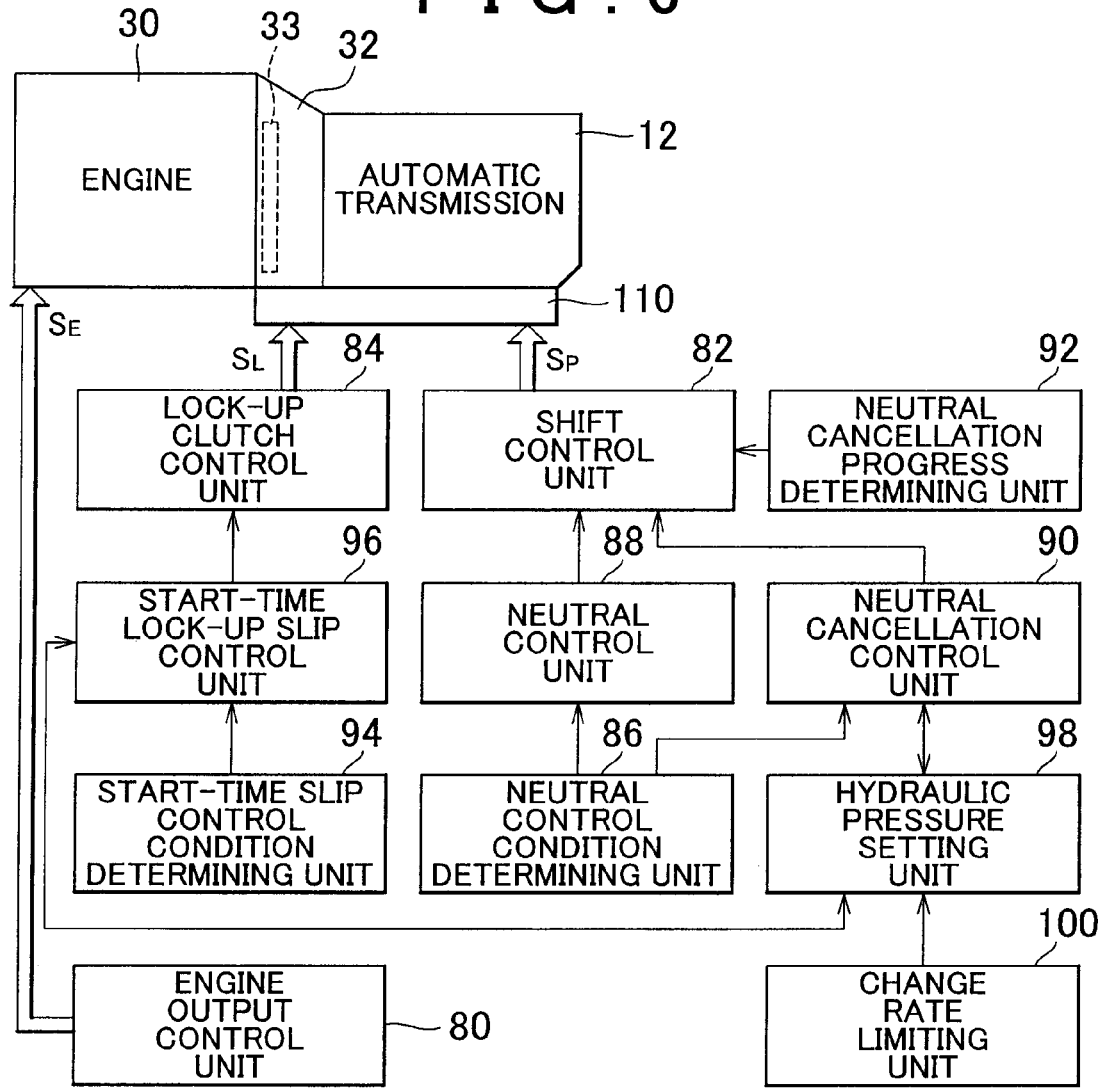
FIG. 6 is a functional block diagram useful for explaining control functions of an electronic control unit of FIG. 3.
Figure 7:
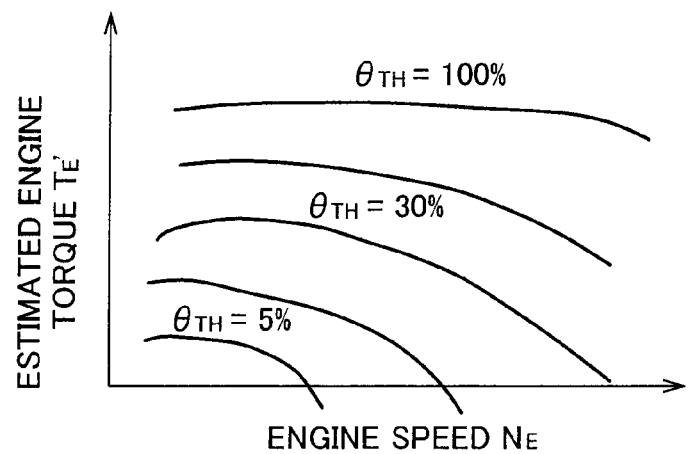
FIG. 7 is a view showing one example of relationship (engine torque map) obtained by experiment and stored in advance, between the engine speed and the estimated engine torque, using the throttle opening as a parameter.

FIG. 6 is a functional block diagram useful for explaining control functions performed by the electronic control unit 50. In FIG. 6, an engine output control unit 80 generates engine output control command signals $S_E$ for controlling the opening and closing of the electronic throttle valve by the throttle actuator for throttle control, controlling the amount of fuel injected from the fuel injection device(s) for fuel injection amount control, and controlling the ignition device(s), such as an igniter(s), for ignition timing control. For example, the engine output control unit 80 controls the opening and closing of the electronic throttle valve so as to achieve a throttle opening $\theta_{TH}$ that provides a target engine torque $T_E^*$ determined based on the actual engine speed $N_E$ from the relationships (engine torque map) as shown in FIG. 7 between the engine speed $N_E$ and the estimated value $T_E'$ of engine torque $T_E$ (which will be called "estimated engine torque"), using the throttle opening $\theta_{TH}$ as a parameter. The relationship as shown in FIG. 7 is obtained by experiment and stored in advance. The engine output control unit 80 also controls the amount of fuel injected from the fuel injection device(s), and controls the ignition device(s), such as an igniter(s). The above-mentioned target engine torque $T_E^*$ is determined by the electronic control unit 50 so that the engine torque $T_E^*$ increases as the accelerator pedal stroke Acc increases, based on the accelerator pedal stroke Acc corresponding to the amount of torque requested by the driver, for example. Thus, the target engine torque $T_E^*$ may be referred to as driver-requested engine torque.

Figure 8:
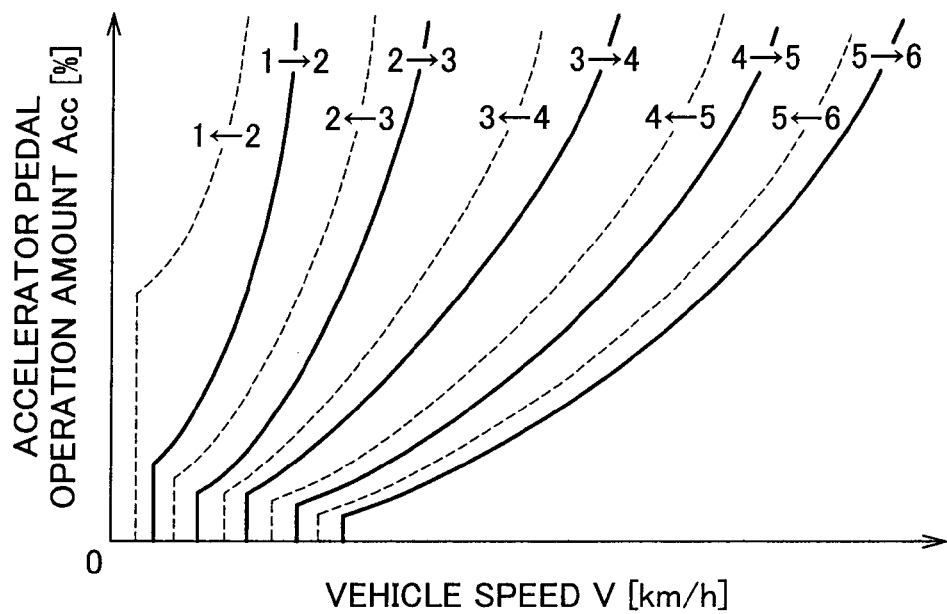
FIG. 8 is a view showing one example of shift diagram used when determining a gear position of the automatic transmission of FIG. 1.

The shift control unit 82 makes a shift determination based on vehicle conditions represented by the actual vehicle speed V and the accelerator pedal stroke Acc, from the pre-stored relationships (shift map, shift diagram) as shown in FIG. 8 in which the vehicle speed V and the accelerator pedal stroke Acc are variables, so as to determine whether shifting of the automatic transmission 12 should be carried out. Then, the shift control unit 82 determines the gear position to which the automatic transmission 12 should be shifted, and generates a shift command for executing automatic shift control of the automatic transmission 12 so as to establish the thus determined gear position. For example, the shift control unit 82 generates hydraulic control command signals (shift output command values) $S_P$ for engaging and/or releasing the hydraulic friction devices involved in shifting of the automatic transmission 12, to the hydraulic control circuit 110.

In the shift map of FIG. 8, solid lines indicate shift lines (upshift lines) based on which it is determined that the automatic transmission 12 should be shifted up, and broken lines indicate shift lines (downshift lines) based on which it is determined that the automatic transmission 12 should be shifted down. The shift lines in the shift map of FIG. 8 are used for determining whether the actual vehicle speed V has passed any of the lines on the horizontal line indicating the actual accelerator pedal stroke Acc(%), namely, for determining whether the actual vehicle speed V exceeds a value (shift-point vehicle speed) $V_S$ on the shift line at which shifting should be carried out. Each of the shift lines is stored in advance as a series of values Vs, or shift-point vehicle speeds.

The hydraulic control command signal $S_P$ is a torque command value for controlling the torque transmission capacity (clutch torque) corresponding to the clutch pressure of the clutch C or brake B, namely, a hydraulic pressure command value for generating an engaging pressure that provides the required torque transmission capacity. For example, a hydraulic pressure command value that causes the hydraulic oil to be discharged so as to provide the required torque transmission capacity for releasing the friction device to be released is generated as a torque command value for the friction device to be released, and a hydraulic pressure command value that causes the hydraulic oil to be supplied so as to provide the required torque transmission capacity for engaging the friction device to be applied is generated as a torque command value for the friction device to be applied. Also, when the automatic transmission 12 is not in any shifting operation but kept at a certain gear position GS, a hydraulic pressure command value for generating an engaging pressure that can keep the frictional force that withstands the transmission input torque $T_{IN}$ (namely, an engaging pressure that can ensure the torque transmission capacity) is generated. In the hydraulic control circuit 110, the linear solenoid valves SL1-SL5 are operated according to the hydraulic control command signals $S_P$ received from the shift control unit 82, so as to carry out shifting of the automatic transmission 12 or keep the automatic transmission 12 in the current gear position GS, by operating the respective hydraulic actuators ACT1-ACT5 of the hydraulic friction devices involved in establishment (formation) of the gear position GS.

Figure 9:
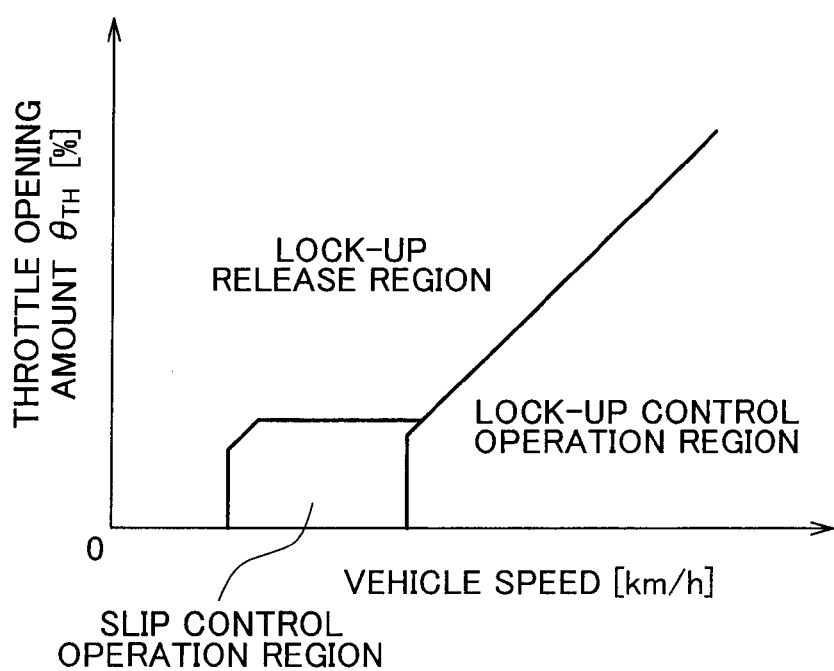
FIG. 9 is a view showing one example of lock-up region diagram for use in control of the lock-up clutch in a torque converter.

The lock-up clutch control unit 84 controls switching of the operating state of the lock-up clutch 33 based on vehicle conditions represented by the actual vehicle speed V and the throttle opening $\theta_{TH}$, according to a pre-stored relationship (map, lock-up region diagram) as shown in FIG. 9 having a lock-up release (lock-up OFF) region, a slip control region (lock-up slip control operation region) and a lock-up control operation (lock-up ON) region, and using the vehicle speed V and the throttle opening $\theta_{TH}$ as variables. For example, the lock-up clutch control unit 84 determines whether the operating state of the lock-up clutch 33 is to be switched to any of the lock-up release region, lock-up slip control operation region, and lock-up control operation region, based on the actual vehicle conditions, from the above-indicated lock-up region diagram, and generates a lock-up control command signal $S_L$ for switching of the lock-up clutch 33 to the lock-up release or switching to the lock-up slip control operation or lock-up control operation, to the hydraulic control circuit 110. Also, if the lock-up clutch control unit 84 determines that the operating state of the lock-up clutch 33 is in the lock-up slip control operation region, it sequentially calculates the actual slip amount $N_S (=N_E-N_T)$ of the lock-up clutch 33, and generates a lock-up control command signal $S_L$ for controlling the pressure difference $\Delta P$ so that the actual slip amount $N_S$ becomes equal to the target slip amount Ns*, to the hydraulic control circuit 110. In a relatively high-vehicle-speed region, for example, the lock-up clutch 33 is locked up (fully engaged) to directly connect the pump impeller 32p and the turbine wheel 32t to each other, thereby to eliminate a slip loss (internal loss) of the torque converter 32 and improve the fuel efficiency. In a relatively low- to middle-vehicle-speed region, slip control (lock-up slip control) for engaging the lock-up clutch 33 while allowing a certain minute slip between the pump impeller 32p and the turbine wheel 32t is carried out, so as to expand the lock-up operation region, and improve the transmission efficiency of the torque converter 32, which leads to improved fuel efficiency.

The hydraulic control circuit 110 operates the switching solenoid valve SL to switch the valve position of the lock-up relay valve 124 between the release (OFF) position and the apply (ON) position, so as to switch the lock-up clutch 33 between the released state and the slipping state or engaged state, according to the lock-up control command signal $S_L$ from the lock-up clutch control unit 84. Also, the hydraulic control circuit 110 operates the slip-control linear solenoid valve SLU to engage the lock-up clutch 33 or control the slip amount $N_S$ of the lock-up clutch 33, so that the torque capacity $T_C$ of the lock-up clutch 33 that is in the slipping state or engaged state is increased or reduced via the lock-up control valve 126, according to the lock-up control command signal $S_L$ from the lock-up clutch control unit 84.

The vehicle 10 of this embodiment performs neutral control for reducing the idling load of the engine 30 while the vehicle is stopped, for example. When predetermined neutral control conditions are satisfied, for example, the neutral control is executed to place the clutch C1 as a start clutch in a certain slipping state or released state and bring the power transmission path in the automatic transmission 12 into a restricted power transmission condition (namely, a condition equivalent to an interrupted power transmission condition or the interrupted power transmission condition). The above-mentioned slipping state of the clutch C1 is equivalent to a released state in which the clutch C1 slightly slips but there is almost no engaging load on the clutch C1, i.e., a released state in which the clutch C1 has almost no torque transmission capacity.

More specifically, a neutral control condition determining unit 86 determines whether predetermined neutral control conditions are satisfied when the shift lever 74 is in one of the running positions, for example. Namely, the neutral control condition determining unit 86 serves as a neutral control execution determining unit that sequentially determines whether execution of the neutral control is to be started, by determining whether the predetermined neutral control conditions are satisfied. The predetermined neutral control conditions include, for example, conditions that the vehicle 10 is stopped or at rest, and the accelerator pedal 56 is not depressed, while the foot brake pedal 70 is depressed. The neutral control condition determining unit 86 determines that the neutral control conditions are satisfied, for example, when the lever position $P_{SH}$ is the "D" position, and the vehicle speed V is equal to a given criteria value based on which it is determined that the vehicle speed is equal to zero, or the vehicle is stopped or at rest, while the accelerator pedal stroke Acc is equal to a given criteria value based on which it is determined that the pedal stroke is equal to zero, or the accelerator pedal is released, and a signal indicative of the operation (ON) $B_{ON}$ of the brake pedal is generated from the brake switch 68.

The neutral control condition determining unit 86 determines whether the predetermined neutral control conditions are satisfied during execution of neutral control by a neutral control unit 88 that will be described later, so as to sequentially determine whether the neutral control is to be cancelled (finished), namely, whether a return from neutral control is to be started. Thus, the neutral control condition determining unit 86 also serves as a neutral control cancellation determining unit. For example, the neutral control condition determining unit 86 determines that the cancellation of the neutral control is to be started when, during neutral control of the neutral control unit 88, the lever position $P_{SH}$ has been changed (i.e., the shift lever 74 has been operated) from the "D" position, or the accelerator pedal stroke Acc becomes equal to or larger than a given criteria value based on which it is determined that the accelerator pedal 56 is depressed, or the signal indicative of the operation (ON) $B_{ON}$ ceases to be generated from the brake switch 68 (i.e., in the case of brake OFF).

When the neutral control condition determining unit 86 determines that the predetermined neutral control conditions are satisfied while the shift lever 74 is in the "D" position, for example, the neutral control unit 88 generates a neutral control execution command for placing the clutch C1 as an engaging device for establishing the first-speed gear position in a certain slipping state or released state, to the shift control unit 82, so as to execute neutral control for bringing the power transmission path including the automatic transmission 12 into a restricted power transmission condition or interrupted power transmission condition. According to the neutral control execution command, the shift control unit 82 generates, to the hydraulic control circuit 110, a clutch release command for reducing the engaging pressure of the clutch C1 according to hydraulic pressure command values of the clutch C1, namely, according to a predetermined release pattern as set pressures for normal N (neutral) control, which are set in advance so as to place the clutch C1 in a certain slipping state or released state. With the power transmission in the automatic transmission 12 thus restricted or interrupted (released), the load on the downstream side of the torque converter 32 is reduced, and the torque converter 32 is rotated substantially as a unit so that the idling load of the engine 30 is reduced, resulting in improvements of the fuel efficiency and NVH (Noise, Vibration and Harshness). Thus, under the neutral control, the clutch C1 is placed in, for example, a released state (or a condition immediately before engagement, in which the clutch C1 is slightly engaged while slipping), so that the power transmission path in the automatic transmission 12 is brought into a substantially released condition, in which the automatic transmission 12 is in a start standby condition in which the vehicle is able to immediately start upon switching of the clutch C1 from half-engagement to full engagement.

When the neutral control condition determining unit 86 determines, during neutral control of the neutral control unit 88, that cancellation of the neutral control is to be started, a neutral cancellation control unit 90 cancels (finishes) the neutral control, or makes a return from neutral control, by generating, to the shift control unit 82, a neutral control cancellation command for increasing the torque transmission capacity of the clutch C1 as an engagement device to be applied to establish the first-speed gear position and engaging the clutch C1, so that the power transmission path including the automatic transmission 12 is brought into a condition that permits power transmission. According to the neutral control cancellation command, the shift control unit 82 generates, to the hydraulic control circuit 110, a clutch engagement command for increasing the engaging pressure (C1 clutch pressure) $P_{C1}$ of the clutch C1 according to hydraulic pressure command values of the clutch C1, namely, according to a predetermined engagement pattern as set pressures for normal cancellation, which are set in advance so as to place the clutch C1 in an engaged state.

Figure 10:
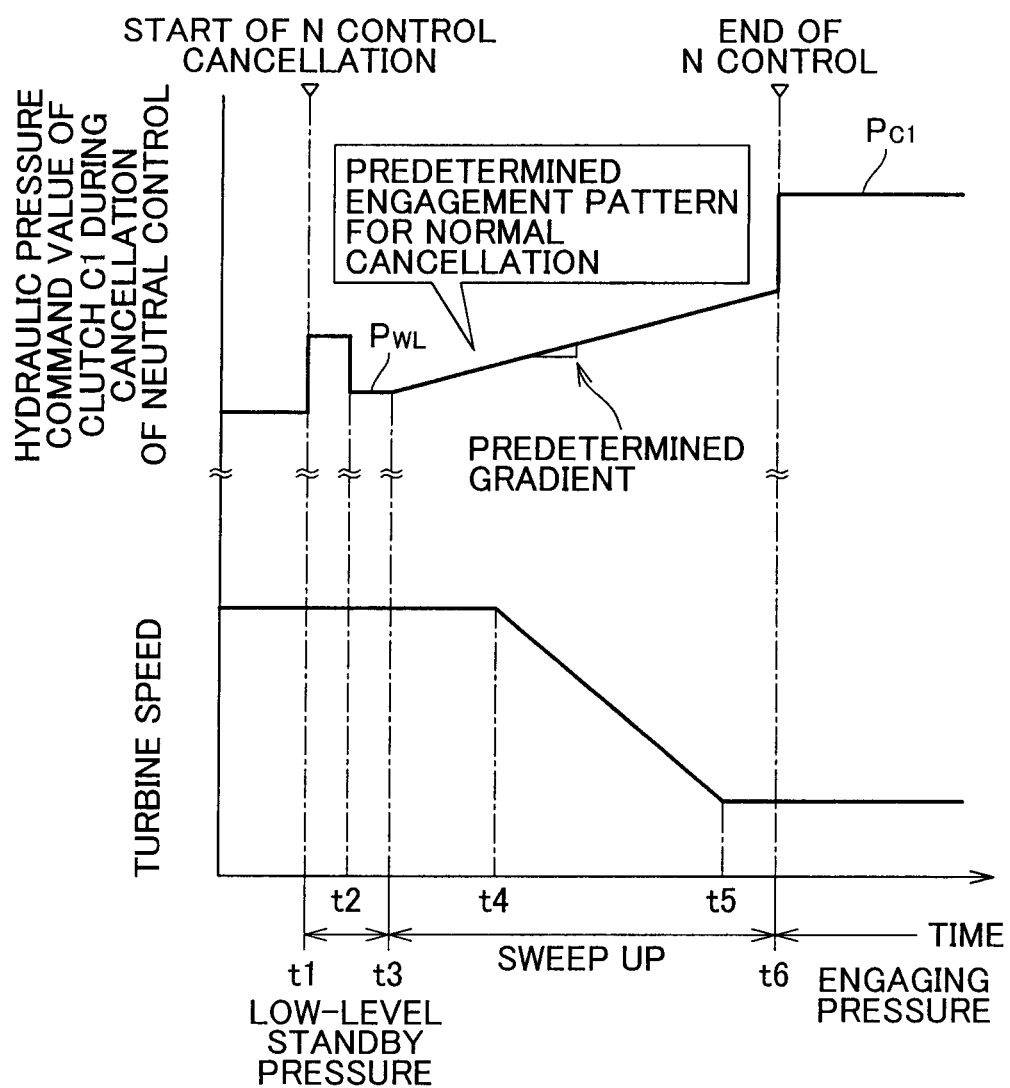
FIG. 10 shows a predetermined engagement pattern used when neutral control is normally cancelled without involving start-time lock-up slip control, including one example of hydraulic pressure command value of a clutch during cancellation of neutral control.

The predetermined engagement pattern for normal cancellation is used, for example, when the neutral control is cancelled in response to brake OFF (release of the brake pedal) but the accelerator pedal is kept released, or when the vehicle is started with the accelerator pedal depressed but start-time lock-up slip control is not performed, namely, neutral control is cancelled without involving start-time lock-up slip control. Namely, the above-mentioned engagement pattern is used at the time of normal cancellation when the cancellation of the neutral control is effected solely. As the predetermined engagement pattern for normal cancellation, the hydraulic pressure command value is set as shown in FIG. 10 by way of example, so as to increase the torque transmission capacity (engaging pressure $P_{C1}$) of the clutch C1 for engagement of the clutch C1, so that the turbine speed $N_T$ is reduced at a given gradient toward the rotational speed $N_{S3}$ of the sun gear S3 which is bound by the vehicle speed V as the output-side rotational speed of the clutch C1, namely, so that a difference $\Delta N_{C1}$ (=$N_T$–$N_{S3}$) in the rotational speed between the input and output of the clutch C1 becomes close to and equal to zero at a given gradient. Namely, the C1 clutch pressure $P_{C1}$ is set so that the gradient of the turbine speed $N_T$ that is changed by engagement of the clutch C1 toward the rotational speed $N_{S3}$ of the sun gear S3 at the time of completion of engagement of the clutch C1 becomes equal to a predetermined gradient. The given gradient or predetermined gradient is a given gradient (a given rate of change $(dN_T/dt)'$) of the turbine speed $N_T$, which is obtained by experiment in advance and set so that the neutral control is cancelled as soon as possible so as to improve the starting response, while suppressing engagement shock of the clutch C1, shock caused by inertia torque produced due to reduction of the turbine speed $N_T$, and so forth. Namely, the above-mentioned predetermined engagement pattern for normal cancellation is determined so as to make the execution time of cancellation of neutral control (i.e., a period of time for which cancellation of neutral control is carried out) equal to a constantly stable time or fixed time.

While the rotational speed $N_{S3}$ of the sun gear S3 is different from the input rotational speed $N_{IN}$ that is equal to the turbine speed $N_T$, the speed $N_{S3}$ becomes equal to the input rotational speed $N_{IN}$ due to engagement of the clutch C1; therefore, the rotational speed $N_{S3}$ may be regarded as the input rotational speed of the automatic transmission 12. In this embodiment, therefore, the rotational speed of the input shaft 26 is referred to as the input rotational speed $N_{IN}$, and the rotational speed $N_{S3}$ of the sun gear S3 is referred to as the transmission input rotational speed $N_{S3}$. Like the turbine speed $N_T$, for example, the transmission input rotational speed $N_{S3}$ may be directly detected by a rotation sensor, but the transmission input rotational speed $N_{S3}$ ($=\gamma GS \times N_{OUT}$) may be calculated by the electronic control unit 50, based on the output rotational speed $N_{OUT}$ and the speed ratio $\gamma GS$ in the current gear position GS of the automatic transmission 12.

In FIG. 10 showing the hydraulic pressure command value of the clutch C1 according to the predetermined engagement pattern for normal cancellation, a hydraulic pressure command value for fast filling starts being generated (at time t1), and then the hydraulic pressure command value is kept at a low-level standby pressure $P_{WL}$ for standby at a low pressure (during a period between time t2 and time t3). Then, the hydraulic pressure command value is gradually increased from the low-level standby pressure $P_{WL}$ at a given gradient (from time t3) so that the torque transmission capacity of the clutch C1 is increased so as to make the difference $\Delta N_{C1}$ in the rotational speed equal to zero, namely, engage the clutch C1, while suppressing engagement shock. Then, while the hydraulic pressure command value is gradually increased from the low-level standby pressure $P_{WL}$, the torque transmission capacity of the clutch C1 starts increasing and the turbine speed $N_T$ starts decreasing (at time t4). If the difference $\Delta N_{C1}$ in the rotational speed becomes equal to zero (at time t5), the hydraulic pressure command value is set, after a given period of time, to a value that provides the final engaging pressure $P_{C1}$, and the neutral control is finished (at time t6).

The low-level standby pressure $P_{WL}$ and the given gradient are set according to, for example, the accelerator pedal stroke Acc, throttle opening $\theta_{TH}$, or the like, so that the turbine speed $N_T$ is reduced at a given gradient toward the transmission input rotational speed $N_{S3}$, namely, so that the gradient of the turbine speed $N_T$ that is changed by engagement of the clutch C1 becomes equal to a predetermined gradient. More specifically, as the accelerator pedal stroke Acc increases, namely, the throttle opening $\theta_{TH}$ increases, the engine torque $T_E$ increases, namely, the transmission torque $T_{IN}$ transmitted to the clutch C1 (namely, the torque corresponding to the transmission input torque $T_{IN}$) increases. Therefore, in setting the low-level standby pressure $P_{WL}$ and the given gradient, if the transmission torque $T_{IN}$ transmitted to the clutch C1 becomes larger than the estimated or assumed torque, for example, the gradient of the turbine speed $N_T$ becomes gentler (i.e., the rate of change of the turbine speed $N_T$ is reduced), and the execution time of cancellation of neutral control is prolonged, resulting in reduction of the starting response. To the contrary, if the transmission torque $T_{IN}$ transmitted to the clutch C1 is smaller than the estimated or assumed torque, for example, the gradient of the turbine speed $N_T$ becomes steeper (i.e., the rate of change of the turbine speed $N_T$ is increased), and the execution time of cancellation of neutral control is shortened, which gives rise to a possibility of increasing shock upon engagement of the clutch C1. Thus, in order to reduce the turbine speed NT at a given gradient or rate toward the transmission input rotational speed $N_{S3}$, namely, to make the execution time of cancellation of neutral control equal to a constantly stable period of time, the predetermined engagement pattern for normal cancellation is set so that the given gradient (rate of change) increases or the low-level standby pressure $P_{WL}$ increases as the accelerator pedal stroke Acc is larger, namely, as the transmission torque $T_{IN}$ transmitted to the input side of the clutch C1 increases. Needless to say, various modifications may be made to this embodiment; for example, the final engaging pressure $P_{C1}$ may be increased as the accelerator pedal stroke Acc is larger, and the throttle opening $\theta_{TH}$, intake air amount Q, fuel injection amount, or estimated engine torque $T_E'$ calculated from the throttle opening $\theta_{TH}$ or the intake air amount Q may be used in place of the accelerator pedal stroke Acc.

Also, the above-indicated given period of time (between time t5 and time t6 in FIG. 10) is not necessarily required to be provided, but the neutral control may be finished by generating the hydraulic pressure command value that provides the final engaging pressure $P_{C1}$ when it is determined that the difference $\Delta N_{C1}$ in the rotational speed is equal to zero, namely, when it is determined that the turbine speed $N_T$ is equal to the transmission input rotational speed $N_{S3}$.

Returning to FIG. 6, a neutral cancellation progress determining unit 92 determines whether the engagement of the clutch C1 is completed, namely, whether the turbine speed $N_T$ becomes equal to the transmission input rotational speed $N_{S3}$, in the process of cancellation of neutral control by the neutral cancellation control unit 90 and the shift control unit 82. For example, the neutral cancellation progress determining unit 92 determines whether the engagement of the clutch C1 is completed, based on whether the difference $\Delta N_{C1}$ ($=N_T-N_{S3}$) in the rotational speed between the input and output of the clutch C1 becomes equal to a given criteria value (indicating that the rotational speed difference is equal to zero) based on which it is determined that the engagement of the clutch C1 is completed. Namely, the neutral cancellation progress determining unit 92 determines whether the turbine speed $N_T$ becomes equal to the transmission input rotational speed $N_{S3}$, based on whether the rotational speed difference $\Delta N_{C1}$ between the turbine speed $N_T$ and the transmission input rotational speed $N_{S3}$ becomes equal to a given criteria value (indicating that the difference is equal to zero) based on which it is determined that the turbine speed $N_T$ is equal to the transmission input rotational speed $N_{S3}$. When the neutral cancellation progress determining unit 92 determines that the engagement of the clutch C1 is completed, the shift control unit 82 generates, to the hydraulic control circuit 110, a clutch engagement command for controlling the hydraulic control circuit 110 toward completion of neutral control so as to immediately achieve the final engagement pressure $P_{C1}$ after a given period of time (or immediately achieve the final engagement pressure $P_{C1}$) under the command engagement command according to the predetermined engagement pattern.

Thus, the neutral control is performed in the vehicle 10 of this embodiment while the vehicle is stopped, for example. In the meantime, when the vehicle starts in response to an operation to depress the accelerator pedal 56 (acceleration ON), for example, start-time lock-up slip control is performed in the vehicle 10 of this embodiment so as to suppress or prevent an excessive increase in the engine speed $N_E$ and reduce the fuel consumption. The start-time lock-up slip control is vehicle start control executed when predetermined start-time lock-up slip control conditions are satisfied, for example, for bringing the lock-up clutch 33 into slip engagement and causing a part of the engine torque $T_E$ to be applied to the automatic transmission 12 via the lock-up clutch 33, so that power generated upon starting of the vehicle is transmitted via the torque converter 32 and the lock-up clutch 33. In the start-time lock-up slip control, the engine speed $N_E$ is prevented from excessively increasing to be higher than a target engine speed $N_E^*$ that is set in advance so as to achieve both the desired fuel efficiency and power performance according to the accelerator pedal stroke Acc, for example, thereby to reduce the fuel consumption. Under vehicle conditions in which the start-time lock-up slip control is executed, it is difficult to control the slip amount $N_S (=N_E-N_T)$ since the engine speed $N_E$ is in a transient period of rising or increasing, immediately after depression of the accelerator pedal (e.g., immediately after starting of the vehicle) in a condition where the lock-up clutch 33 is released. Therefore, in the start-time lock-up slip control, an excessive increase of the engine speed $N_E$ is suppressed or prevented by open loop control (open control, feed-forward control) in the initial period of vehicle starting. Then, after the engine speed $N_E$ becomes close to and equal to the target engine speed $N_E^*$, and the slip amount $N_S$ is reduced by some degree, acceleration-time lock-up slip control is executed by switching to feedback control using a closed loop, and controlling the slip amount $N_S$ (namely, controlling the torque capacity $T_C$ of the lock-up clutch 33). It is to be understood that the acceleration-time lock-up slip control may be regarded as one of a series of control operations of the start-time lock-up slip control, without being particularly distinguished from the start-time lock-up slip control. In this embodiment, the start-time lock-up slip control performed under open control will be mainly explained.

More specifically, in FIG. 6, a start-time slip control condition determining unit 94 determines whether predetermined start-time lock-up slip control conditions are satisfied. Namely, the start-time slip control condition determining unit 94 is a start-time lock-up slip control execution determining unit that sequentially determines whether execution of the start-time lock-up slip control is to be started, by determining whether the predetermined start-time lock-up slip control conditions are satisfied. The predetermined start-time lock-up slip control conditions include conditions that the accelerator pedal stroke Acc is equal to or larger than a predetermined value (acceleration ON), and the vehicle speed V is equal to or higher than a predetermined value, namely, the vehicle wheels (e.g., the driving wheels 38) have started rolling or rotating. The start-time slip control condition determining unit 94 determines that the start-time lock-up slip control conditions are satisfied when the accelerator pedal 56 is depressed (acceleration ON) so that the accelerator pedal stroke Acc exceeds a given criteria value (indicating that Acc=0%) for determining the acceleration OFF state, and the vehicle speed V exceeds a given criteria value (indicating that the vehicle speed is equal to zero) for determining that the vehicle is stopped, in a condition where the lever position $P_{SH}$ is the "D" position.

When the start-time slip control condition determining unit 94 determines that the predetermined start-time lock-up slip control conditions are satisfied, a start-time lock-up slip control unit 96 generates a start-time lock-up slip control execution command for controlling the lock-up clutch 33 toward the apply side so that the clutch 33 is engaged while slipping, to the lock-up clutch control unit 84, so as to execute start-time lock-up slip control for restricting or controlling the engine speed $N_E$ when the vehicle is started in response to an operation to depress the accelerator pedal. According to the start-time lock-up slip control execution command, the lock-up clutch control unit 84 sets a target engine speed $N_E^*$ that would achieve both the desired fuel efficiency and power performance in accordance with the accelerator pedal stroke Acc, for example. Then, the lock-up clutch control unit 84 generates, to the hydraulic control circuit 110, a slip engagement command for increasing the lock-up clutch pressure $P_{LU}$ of the lock-up clutch 33 according to a predetermined slip engagement pattern, or hydraulic pressure command values of the lock-up clutch 33, as set pressures for normal starting which are set in advance so as to control the lock-up clutch 33 toward the apply side so that the clutch 33 is engaged while slipping. With the lock-up clutch 33 thus engaged while slipping upon starting of the vehicle, the engine speed $N_E$ is prevented from excessively increasing to be higher than the target engine speed $N_E^*$, and is kept at (or made close to and equal to) the target engine speed $N_E^*$, resulting in an improved fuel efficiency. Thus, under the start-time lock-up slip control, the engine speed $N_E$ is prevented from excessively increasing and is kept at the target engine speed $N_E^*$, by controlling the slip amount $N_S$ as a difference between the target engine speed $N_E^*$, and the turbine speed $N_T$ that varies with the vehicle speed V. It is to be noted that the lock-up clutch control unit 84 performs certain start-time lock-up slip control using open (open-loop) control in the initial period of vehicle starting, so as to control the torque capacity $T_C$ of the lock-up clutch 33.

The above-mentioned predetermined slip engagement pattern for normal starting is used, for example, when the vehicle is started from a condition where the vehicle is stopped with no neutral control being executed, or start-time lock-up slip control is executed after neutral control is finished. Namely, the predetermined slip engagement pattern is used at normal times at which start-time lock-up slip control is performed solely. As the predetermined slip engagement pattern for normal starting, as shown in FIG. 11 by way of example, the hydraulic pressure command value of the lock-up clutch 33 is controlled so as to increase the torque capacity $T_C$ (lock-up clutch pressure $P_{LU}$) of the lock-up clutch 33 for slip engagement of the clutch 33, so that the engine speed $N_E$ is prevented from excessively increasing to be higher than the target engine speed $N_E^*$, and is kept at (or is made close to and equal to) the target engine speed $N_E^*$.

Figure 11:
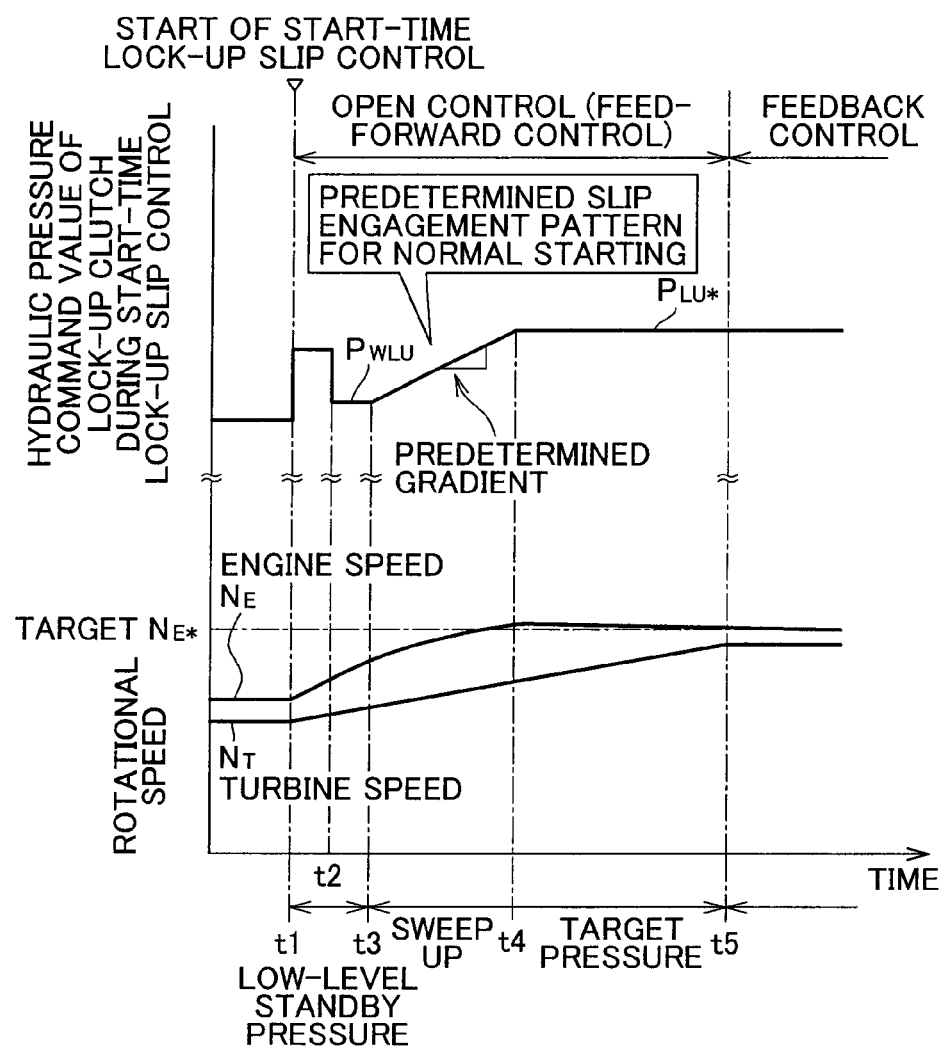
FIG. 11 shows a predetermined slip engagement pattern for normal starting, according to which start-time lock-up slip control is executed solely, including one example of hydraulic pressure command value of the lock-up clutch during the start-time lock-up slip control.

In FIG. 11 showing the hydraulic pressure command value (corresponding to the signal pressure $P_{SLU}$ proportional to the drive current $I_{SLU}$ as a command value to the slip-control linear solenoid valve SLU) of the lock-up clutch 33 in the predetermined slip engagement pattern for normal starting, a hydraulic pressure command value for fast filling starts being generated (at time t1), and then the hydraulic pressure command value is kept at a low-level standby pressure $P_{WLU}$ for standby at a low pressure (during a period between time t2 and time t3). Then, the hydraulic pressure command value is gradually increased from the low-level standby pressure $P_{WLU}$ toward a target hydraulic pressure $P_{LU}^*$ at a given gradient or rate for increasing the torque capacity $T_C$ (lock-up clutch pressure $P_{LU}$) of the lock-up clutch 33 so that the lock-up clutch 33 is brought into slip engagement (during a period between time t3 and time t4). Then, the hydraulic pressure command value is kept at the target hydraulic pressure $P_{LU}^*$ so that the engine speed $N_E$ is kept at (or made close to and equal to) the target engine speed $N_E^*$ (from time t4).

When the slip amount $N_S$ is reduced to some extent after the engine speed $N_E$ is made close to and equal to the target engine speed $N_E^*$, for example, the control mode is switched from the open control to the feedback control, under which the slip amount $N_S$ is controlled (from time t5).

The low-level standby pressure $P_{WLU}$, the given gradient, and the target hydraulic pressure $P_{LU}^*$ are set according to, for example, the accelerator pedal stroke Acc, throttle opening $\theta_{TH}$, etc., so as to prevent the engine speed $N_E$ from excessively increasing to be higher than the target engine speed $N_E^*$, and keep the engine speed $N_E$ at the target engine speed $N_E^*$ (or make the engine speed $N_E$ close to and equal to the target engine speed $N_E^*$). Namely, the engine torque $T_E$ increases, or the engine 30 runs at a rapidly increasing speed, as the accelerator pedal stroke Acc increases, or the throttle opening $\theta_{TH}$ increases. Therefore, from the viewpoint of restricting the engine speed $N_E$ by increasing the torque capacity $T_C$ at a higher rate as the accelerator pedal stroke Acc is larger, the predetermined slip engagement pattern for normal starting is set so that, as the accelerator pedal stroke Acc is larger, the above-mentioned gradient is increased, the target hydraulic pressure $P_{LU}^*$ is increased, and/or the low-level standby pressure $P_{WLU}$ is increased. Needless to say, various modifications may be made to this embodiment; for example, the throttle opening $\theta_{TH}$, intake air amount Q, fuel injection amount, or estimated engine torque $T_E'$ calculated from the throttle opening $\theta_{TH}$ or the intake air amount Q may be used in place of the accelerator pedal stroke Acc.

In the meantime, the control for engaging the clutch C1 is performed in cancellation of neutral control, and the control for bringing the lock-up clutch 33 into slip engagement is performed as start-time lock-up slip control. Therefore, if the cancellation of neutral control and the start-time lock-up slip control are carried out in an overlapping manner when the vehicle is started, the engagement of the clutch C1 and the slip engagement of the lock-up clutch 33 may have influences on each other, and the control for cancellation and the lock-up slip control may not be stably accomplished. In view of this situation, it may be considered to execute the control for cancellation of neutral control and the start-time lock-up slip control one after the other, in order to stably carry out the respective controls. In this case, however, the effect of improving the fuel efficiency due to the start-time lock-up slip control may be reduced, or the starting response may be reduced due to a delay in the start of cancellation of neutral control, or shock caused by engagement of the start clutch may be increased due to reduction of the execution time for which control for cancellation of neutral control is performed.

In this embodiment, therefore, when the start-time lock-up slip control is additionally performed by the start-time lock-up slip control unit 96 during cancellation of the neutral control effected by the neutral cancellation control unit 90, the gradient (or rate of change) of the turbine speed $N_T$ that is changed, by engagement of the clutch C1, toward the transmission input rotational speed $N_{S3}$ at the time of completion of engagement of the clutch C1 is controlled by means of the C1 clutch pressure $P_{C1}$, so as to stably carry out the cancellation of neutral control and the start-time lock-up slip control.

More specifically, in a transient engaging condition of the clutch C1 during cancellation of neutral control, the C1 clutch pressure $P_{C1}$ is set based on, for example, the accelerator pedal stroke, the transmission torque $T_{IN}$ transmitted from the engine 30 side to the clutch C1, etc., as described above (see FIG. 10). If the start-time lock-up slip control is additionally executed at this time, the transmission torque $T_{IN}$ transmitted to the clutch C1 changes due to control of the lock-up clutch 33 toward the apply side. Therefore, if the transmission torque $T_{IN}$ transmitted to the clutch C1 is increased in the case where the clutch pressure of the clutch C1 is set according to the predetermined engagement pattern for normal cancellation as shown in FIG. 10, which pattern is used when cancellation of neutral control is effected solely, the time it takes to complete cancellation of neutral control may be prolonged, or the engagement shock of the clutch C1 may be increased. If, on the other hand, the transmission torque $T_{IN}$ transmitted to the clutch C1 is reduced, the gradient (rate of change) of the turbine speed $N_T$ may become steeper (may be increased), which may result in an increase in inertia shock. In this embodiment, therefore, a variation in the transmission torque $T_{IN}$ transmitted to the clutch C1 is calculated based on, for example, the engine torque $T_E$ and the lock-up clutch pressure $P_{LU}$, and the C1 clutch pressure $P_{C1}$ is set according to the variation in the torque. More specifically, the set pressure of the C1 clutch pressure $P_{C1}$ in the predetermined engagement pattern for normal cancellation as shown in FIG. 10, which pattern is set in advance for the case of cancelling neutral control without involving start-time lock-up slip control, is corrected according to the thus calculated variation in the transmission torque $T_{IN}$ transmitted to the clutch C1.

Figure 12:
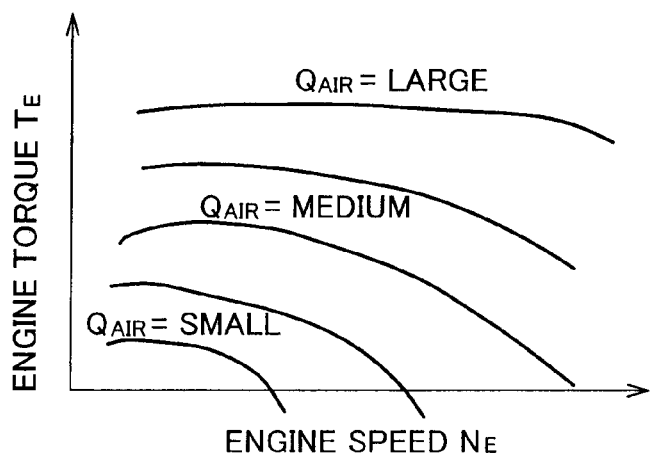
FIG. 12 is a view showing one example of map obtained by experiment and stored in advance, showing the relationship between the engine speed and the engine torque, using the intake air amount as a parameter.
Figure 13:
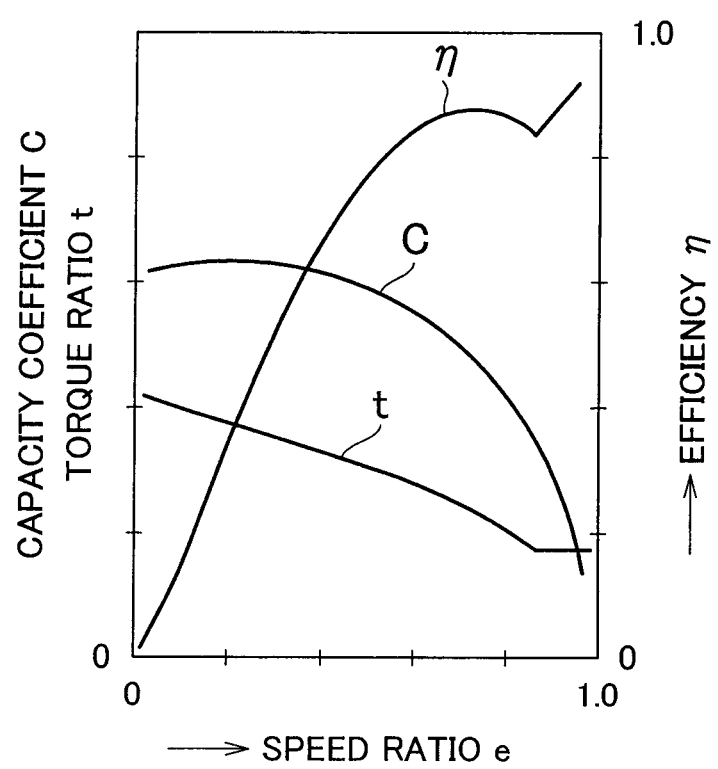
FIG. 13 is a view showing one example of map obtained by experiment and stored in advance, showing certain operating characteristics of the torque converter.

More specifically, referring back to FIG. 6, a hydraulic pressure setting unit 98 calculates the estimated engine torque $T_E$es based on the actual engine speed $N_E$ and intake air amount Q, from the relationship (map, engine torque characteristic diagram) as shown in FIG. 12 between the engine speed $N_E$ and the engine torque $T_E$, using the intake air amount Q as a parameter, which relationship is obtained by experiment and stored in advance. Also, the hydraulic pressure setting unit 98 calculates the torque applied to the automatic transmission 12 via the torque converter 32 during the start-time lock-up slip control, i.e., the transmission torque $T_{IN}$T/C transmitted to the input side of the clutch C1, as torque ($=T_E$es×t) obtained by multiplying the estimated engine torque $T_E$es by the torque ratio t ($=$turbine torque $T_T$/pump torque Tp) of the torque converter 32. Also, the hydraulic pressure setting unit 98 calculates the torque ratio t of the torque converter 32, based on the actual speed ratio e, from the relationship (map, predetermined operating characteristic diagram of the torque converter 32) as shown in FIG. 13 between the speed ratio e ($=$turbine speed $N_T$/pump torque $T_P$ (engine speed $N_E$)) and each of the torque ratio t, efficiency η, and the capacity coefficient C, which relationship is obtained by experiment and stored in advance. Also, the hydraulic pressure setting unit 98 calculates the transmission torque $T_{IN}$L/U transmitted to the input side of the clutch C1 via the lock-up clutch 33 during the start-time lock-up slip control, based on the hydraulic pressure command value (the torque capacity $T_C$ of the lock-up clutch 33) of the lock-up clutch 33 during the start-time lock-up slip control as shown in FIG. 11 by way of example and the estimated engine torque $T_E$es. Then, the hydraulic pressure setting unit 98 adds the transmission torque $T_{IN}$T/C and the transmission torque $T_{IN}$L/U together, to thus calculate the transmission torque $T_{IN}$(T/C+L/U) ($=T_{IN}$T/C+$T_{IN}$L/U) during slip control, which is transmitted to the clutch C1 during the start-time lock-up slip control.

As described above, the set pressure of the C1 clutch pressure $P_{C1}$ in the predetermined engagement pattern for normal cancellation as shown in FIG. 10 is set according to the accelerator pedal stroke Acc, namely, according to the transmission torque $T_{IN}$ transmitted to the input side of the clutch C1, so that the execution time of control for cancellation of neutral control becomes a constantly stable period of time. Accordingly, when the start-time lock-up slip control and the cancellation of neutral control are performed in an overlapping manner, torque assumed to be the transmission torque $T_{IN}$ when cancellation of neutral control is conducted solely can be calculated from the set pressure of the C1 clutch pressure $P_{C1}$ during normal cancellation. Thus, the hydraulic pressure setting unit 98 calculates the cancellation-only transmission torque $T_{IN}N$ transmitted to the clutch C1 when the neutral control is cancelled without involving the start-time lock-up slip control, based on the set pressure of the clutch C1 originally set in the predetermined engagement pattern for normal cancellation, for example. Also, the hydraulic pressure setting unit 98 calculates a torque difference between the transmission torque $T_{IN}(T/C+L/U)$ during slip control and the cancellation-only transmission torque $T_{IN}N$, as a variation (transmission torque variation) $\Delta T_{IN}(=T_{IN}(T/C+L/U)-T_{IN}N)$ in the transmission torque $T_{IN}$.

When the start-time lock-up slip control and the cancellation of the neutral control are carried out in an overlapping manner, for example, the hydraulic pressure setting unit 98 sets the C1 clutch pressure $P_{C1}$ according to the transmission torque variation $\Delta T_{IN}$, so that the gradient of the turbine speed $N_T$ that is changed through engagement of the clutch C1 toward the transmission input rotational speed $N_{S3}$ at the time of completion of engagement of the clutch C1 is made equal to a predetermined gradient $(dN_T/dt)'$. Thus, the gradient of the turbine speed $N_T$ that is changed through engagement of the clutch C1 toward the transmission input rotational speed $N_{S3}$ at the time of completion of engagement of the clutch C1 is controlled by means of the C1 clutch pressure $P_{C1}$. For example, the hydraulic pressure setting unit 98 corrects the set pressure of the clutch C1 in the predetermined engagement pattern for normal cancellation as shown in FIG. 10, according to the transmission torque variation $\Delta T_{IN}$. More specifically, if the transmission torque variation $\Delta T_{IN}$ is a positive value, the hydraulic pressure setting unit 98 corrects the C1 clutch pressure $P_{C1}$ so that it becomes larger than the set pressure of the clutch C1 in the predetermined engagement pattern for normal cancellation, as the transmission torque variation $\Delta T_{IN}$ is larger. For example, as the transmission torque variation $\Delta T_{IN}$ increases, the low-level standby pressure $P_{WL}$ in the predetermined engagement pattern for normal cancellation is increased, or the given gradient in the predetermined engagement pattern for normal cancellation is increased (or made steeper). If, on the other hand, the transmission torque variation $\Delta T_{IN}$ is a negative value, the hydraulic pressure setting unit 98 corrects the C1 clutch pressure $P_{C1}$ so that it becomes smaller than the set pressure of the clutch C1 in the predetermined engagement pattern for normal cancellation, as the absolute value of the transmission torque variation $\Delta T_{IN}$ is larger. For example, as the absolute value of the transmission torque variation $\Delta T_{IN}$ increases, the low-level standby pressure $P_{WL}$ in the predetermined engagement pattern for normal cancellation is reduced, or the given gradient in the predetermined engagement pattern for normal cancellation is reduced (or made gentler).

When the cancellation of neutral control is conducted solely, the C1 clutch pressure $P_{C1}$ may be set under open (or open-loop) control, or may be sequentially set under feedback control, so that the gradient of the turbine speed $N_T$ that is changed through engagement of the clutch C1 toward the transmission input rotational speed $N_{S3}$ at the time of completion of engagement of the clutch C1 becomes equal to a predetermined gradient. However, if the C1 clutch pressure $P_{C1}$ is set under feedback control when the cancellation of neutral control is executed along with the start-time lock-up slip control, the feedback control may not be appropriately performed due to an influence of the start-time lock-up slip control. Therefore, when the cancellation of neutral control is executed along with the start-time lock-up slip control, the C1 clutch pressure $P_{C1}$ is set to values corrected by the hydraulic pressure setting unit 98 under open control. In this case, if the actual C1 clutch pressure $P_o$ deviates from the set pressure of the clutch C1 that has been corrected by the hydraulic pressure setting unit 98, the gradient of the turbine speed $N_T$ may become steeper or larger than the predetermined gradient as the neutral control proceeds. In this embodiment, therefore, the C1 clutch pressure $P_{C1}$ is set so that the gradient of the turbine speed $N_T$ that is changed through engagement of the clutch C1 toward the transmission input rotational speed $N_{S3}$ at the time of completion of engagement of the clutch C1 is limited by a predetermined gradient.

More specifically, when the rate of change $(dN_T/dt)$ of the turbine speed $N_T$ exceeds a predetermined rate of change $(dN_T/dt)'$ corresponding to the predetermined gradient (namely, when the absolute value of the rate of change $(dN_T/dt)$ becomes larger than the absolute value of the rate of change $(dN_T/dt)'$), for example, a change rate limiting unit 100 generates a command for correction to the hydraulic pressure setting unit 98 so that the set pressure of the clutch C1 that has been corrected to a higher level is reduced by a given value, or the set pressure of the clutch C1 that has been corrected to a lower level is further reduced by a given value. The given value may be set according to a difference between the rate of change $(dN_T/dt)$ and the rate of change $(dN_T/dt)'$ so that the value increases as the difference in the rate of change increases, or may be set to a predetermined fixed value.

Figure 14:
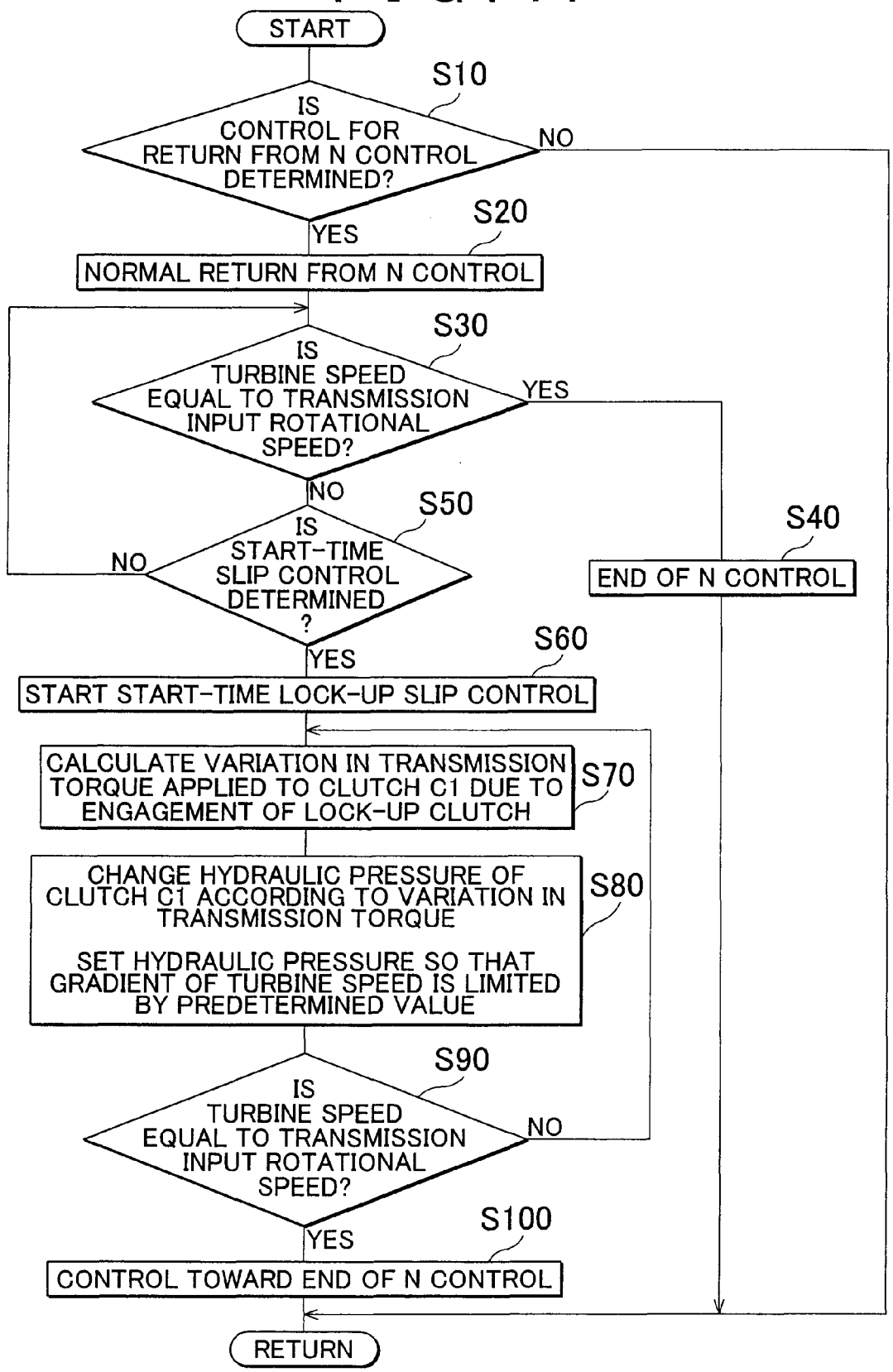
FIG. 14 is a flowchart illustrating a control routine of a first embodiment executed by the electronic control unit of FIG. 3, for stably carrying out cancellation of neutral control and start-time lock-up slip control in an overlapping manner.
Figure 15:
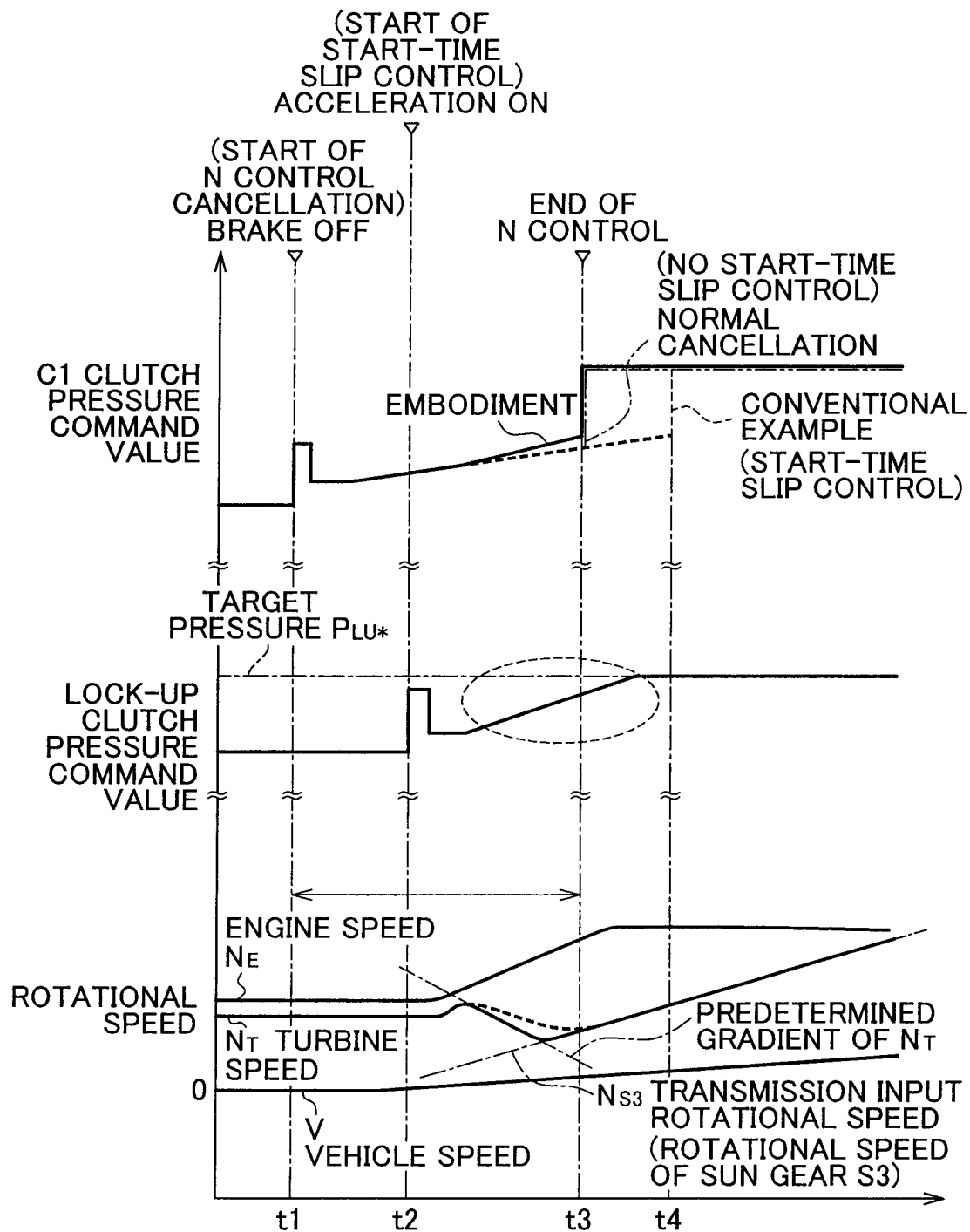
FIG. 15 is a time chart corresponding to the control routine of the first embodiment as shown in FIG. 14.

Next, a control routine associated with starting control of a first embodiment of the invention will be described. FIG. 14 is a flowchart illustrating the control routine of the first embodiment executed by the electronic control unit 50, namely, the control routine for stably carrying out cancellation of neutral control and start-time lock-up slip control when these controls are executed in an overlapping manner. The control routine of FIG. 14 is repeatedly executed at extremely short intervals (or cycle time) of, for example, several milliseconds to several dozens of milliseconds. The routine of the flowchart of FIG. 14 is started under a condition that neutral control is being performed by the neutral control unit 88. FIG. 15 is a time chart corresponding to the control routine of FIG. 14.

In FIG. 14, it is initially determined in step S10 corresponding to the neutral control condition determining unit 86 whether the predetermined neutral control conditions as described above are satisfied, so that it is sequentially determined whether neutral control is to be cancelled, namely, whether control for returning from neutral control is to be started. If a negative decision is made in step S10, the routine of FIG. 14 ends. If an affirmative decision is made in step S10, the control proceeds to step S20 corresponding to the neutral cancellation control unit 90 and the shift control unit 82, in which a neutral control cancellation command for engaging the clutch C1, for example, is generated, so that cancellation of neutral control is started, namely, a return from neutral control is started (at time t1 in FIG. 15). Since execution of start-time lock-up slip control has not been determined at this point in time, a clutch engagement command for increasing the engaging pressure $P_{C1}$ of the clutch C1 according to the predetermined engagement pattern for normal cancellation as shown in FIG. 10, for example, so as to bring the clutch C1 into an engaged state is generated to the hydraulic control circuit 110, according to the neutral control cancellation command. Then, in step S30 corresponding to the neutral cancellation progress determining unit 92, it is determined whether the engagement of the clutch C1 is completed, namely, whether the turbine speed $N_T$ becomes equal to the transmission input rotational speed $N_{S3}$, based on whether a difference $\Delta N_{C1}$ (=$N_T$-$N_{S3}$) in the rotational speed between the input and output of the clutch C1 becomes equal to a certain criteria value indicative of zero difference based on which completion of engagement of the clutch C1 is determined. If an affirmative decision is made in step S30, the control proceeds to step S40 corresponding to the shift control unit 82. In step S40, a clutch engagement command for controlling the engaging pressure $P_{C1}$ of the clutch C1 toward the end of the neutral control so as to immediately establish the final engaging pressure $P_{C1}$ after a certain period of time (or immediately establish the final engagement pressure $P_{C1}$) is generated to the hydraulic control circuit 110 while the C1 clutch pressure $P_{C1}$ is controlled according to the predetermined engagement pattern under the clutch engagement command issued in the above step S20. If a negative decision is made in step S30, on the other hand, it is determined in step S50 corresponding to the start-time slip control condition determining unit 94 whether predetermined start-time lock-up slip control conditions are satisfied, so that it is sequentially determined whether execution of start-time lock-up slip control is to be started. If a negative decision is made in step S50, the control returns to step S30. If an affirmative decision is made in step S50, the control proceeds to step S60 corresponding to the start-time lock-up slip control unit 96 and the lock-up clutch control unit 84. In step S60, a start-time lock-up slip control execution command for controlling the lock-up clutch 33 toward the apply side so as to bring the clutch 33 into slip engagement, for example, is generated, and the start-time lock-up slip control is started (at time t2 in FIG. 15). In this step, according to the start-time lock-up slip control execution command, the target engine speed $N_E^*$ is set, and a slip engagement command for increasing the lock-up clutch pressure $P_{LU}$ of the lock-up clutch 33 according to the predetermined slip engagement pattern for normal starting as shown in FIG. 11 by way of example, which is set in advance so as to control the lock-up clutch 33 toward the apply side for slip engagement, is generated to the hydraulic control circuit 110.

Then, in step S70 corresponding to the hydraulic pressure setting unit 98, a variation (transmission torque variation) $\Delta T_{IN}$ (=$T_{IN}$(T/C+L/C)-$T_{IN}$N) in the transmission torque $T_{IN}$ transmitted to the clutch C1 is calculated based on, for example, the estimated engine torque $T_E$es and the hydraulic pressure command value (lock-up clutch pressure $P_{LU}$, torque capacity $T_C$ of the lock-up clutch 33) of the lock-up clutch 33. Then, in step S80 corresponding to the hydraulic pressure setting unit 98 and the change rate limiting unit 100, the set pressure of the clutch C1 in the predetermined engagement pattern for normal cancellation as shown in FIG. 10, which is set in the above step S20, is corrected according to the transmission torque variation $\Delta T_{IN}$, so that the gradient of the turbine speed $N_T$ that is changed through engagement of the clutch C1 toward the transmission input rotational speed $N_{S3}$ at the time of completion of engagement of the clutch C1 is made equal to a predetermined gradient. At this time, the C1 clutch pressure $P_{C1}$ is set so that the gradient of the turbine speed $N_T$ that is changed through engagement of the clutch C1 toward the transmission input rotational speed $N_{S3}$ at the time of completion of engagement of the clutch C1 is limited by a predetermined gradient. Then, in step S90 corresponding to the neutral cancellation progress determining unit 92, it is determined whether the engagement of the clutch C1 is completed, namely, whether the turbine speed $N_T$ becomes equal to the transmission input rotational speed $N_{S3}$, based on whether the difference $\Delta N_{C1}$ in the rotational speed between the input and output of the clutch C1 becomes equal to a certain criteria value indicative of zero difference based on which completion of engagement of the clutch C1 is determined. If a negative decision is made in step S90, the control returns to step S70. If an affirmative decision is made in step S90, the control proceeds to step S100 corresponding to the shift control unit 82. In step S100, a clutch engagement command for controlling the engaging pressure $P_{C1}$ of the clutch C1 toward the end of the neutral control so as to immediately establish the final engaging pressure $P_{C1}$ after a certain period of time (or immediately establish the final engagement pressure $P_{C1}$) is generated to the hydraulic control circuit 110 (at time t3 in FIG. 15).

Referring to FIG. 15, in a conventional example (broken lines) in which the set pressure of the clutch C1 is not corrected to increase according to the transmission torque variation $\Delta T_{IN}$, the gradient (or rate of change) of the turbine speed $N_T$ becomes gentler (or smaller) as the transmission torque $T_{IN}$ increases, and completion of neutral control (time t4 in FIG. 15) is delayed, resulting in an increase in the execution time of control for cancelling neutral control. In this embodiment (solid lines), on the other hand, the gradient of the turbine speed $N_T$ becomes substantially equal to the predetermined gradient $(dN_T/dt)'$, as in the case where neutral control is cancelled according to a predetermined engagement pattern for normal cancellation as indicated by a two-dot chain line, and the execution time of control for cancelling neutral control is made substantially equal to that of normal cancellation.

According to this embodiment, when the start-time lock-up slip control is additionally executed during cancellation of neutral control, the gradient of the turbine speed $N_T$ that is changed, through engagement of the clutch C1, toward the transmission input rotational speed $N_{S3}$ at the time of completion of engagement of the clutch C1 is controlled using the C1 clutch pressure $P_{C1}$ that is increased so as to engage the clutch C1 upon cancellation of neutral control; therefore, the neutral control can be finished in a constantly stable time, and shock that occurs upon engagement of the clutch C1 can be suppressed or reduced. Thus, when the control for calculation of neutral control and the start-time lock-up slip control are executed in an overlapping manner, the respective controls can be stably performed.

According to this embodiment, a variation (transmission torque variation) $\Delta T_{IN}$ in the transmission torque $T_{IN}$ transmitted to the clutch C1 is calculated based on the estimated engine torque $T_E$es and the lock-up clutch pressure $P_{LU}$, and the C1 clutch pressure $P_{C1}$ is set according to the transmission torque variation $\Delta T_{IN}$; therefore, the gradient of the turbine speed $N_T$ that is changed, through engagement of the clutch C1, toward the transmission input rotational speed $N_{S3}$ at the time of completion of engagement of the clutch is changed in the same manner, irrespective of whether the start-time lock-up slip control is executed or not, for example. Namely, the neutral control can be completed in a constantly stable time, and the execution time of control for cancellation of neutral control can be made substantially constant, irrespective of the magnitude of the accelerator pedal stroke Acc, for example. Also, the C1 clutch pressure $P_{C1}$ can be controlled in accordance with an engaging condition of the lock-up clutch 33, so that shock that occurs upon engagement of the clutch C1, i.e., shock that occurs during cancellation of neutral control, can be advantageously reduced.

Also, according to this embodiment, the set pressure of the C1 clutch pressure $P_{C1}$, which is set in advance when cancelling neutral control without involving start-time lock-up slip control, is corrected according to the transmission torque variation $\Delta T_{IN}$; therefore, the neutral control can be surely completed within a constantly stable time, for example.

Also, according to this embodiment, the C1 clutch pressure $P_{C1}$ is set so that the gradient of the turbine speed $N_T$ that is changed, through engagement of the clutch C1, toward the transmission input rotational speed $N_{S3}$ at the time of completion of the clutch C1 is limited by the predetermined gradient $(dN_T/dt)'$. Therefore, when the actual engaging pressure deviates from the set pressure of the C1 clutch pressure $P_{C1}$, for example, the gradient of the turbine speed $N_T$ is prevented from being steeper than the predetermined gradient $(dN_T/dt)'$, and an increase of shock is avoided, though otherwise there is a possibility that the gradient of the turbine speed $N_T$ becomes steeper than the predetermined gradient $(dN_T/dt)'$, and the shock increases.

According to this embodiment, the C1 clutch pressure $P_{C1}$ is set so that the gradient of the turbine speed $N_T$ that is changed, through engagement of the clutch C1, toward the transmission input rotational speed $N_{S3}$ at the time of completion of engagement of the clutch C1 is made equal to the predetermined gradient $(dN_T/dt)'$; therefore, the neutral control can be appropriately completed within a constantly stable, fixed time.

Next, a second embodiment of the invention will be described. In the following description, the same reference numerals are assigned to portions or elements common to the first embodiment, and explanation of these portions or elements will not be provided.

In the first embodiment as described above, when the cancellation of neutral control and the start-time lock-up slip control are carried out in an overlapping manner, the gradient of the turbine speed $N_T$ that is changed, through engagement of the clutch C1, toward the transmission input rotational speed $N_{S3}$ at the time of completion of engagement of the clutch C1 is controlled using the C1 clutch pressure $P_{C1}$. In the second embodiment, which is implemented in place of or in addition to the first embodiment, when the start-time lock-up slip control is additionally executed by the start-time lock-up slip control unit 96 during cancellation of neutral control by the neutral cancellation control unit 90, the gradient of the turbine speed $N_T$ that is changed, through engagement of the clutch C1, toward the transmission input rotational speed $N_{S3}$ at the time of completion of engagement of the clutch C1 is controlled using the lock-up clutch pressure $P_{LU}$, so as to stably carry out the cancellation of the neutral control and the start-time lock-up slip control, respectively.

More specifically, when cancellation of neutral control is conducted solely, slipping of the torque converter 32 is utilized so as to suppress (or absorb) shock (e.g., engagement shock and inertia shock) caused by engagement of the clutch C1 and variations (fluctuations) in the engine torque $T_E$ that is not stabilized in a transient condition immediately after the accelerator pedal is depressed. In the start-time lock up slip control, on the other hand, the looseness (slipping, released state) with which the torque converter 32 transmits the power of the engine 30 to the automatic transmission 12 is suppressed or reduced due to slip engagement of the lock-up clutch 33. Accordingly, if the start-time lock-up slip control is additionally executed during cancellation of neutral control, the shock (torque variation) that occurs upon engagement of the clutch C1, variations in the engine torque $T_E$ in the transient condition, and the like, are likely to be transmitted to the vehicle wheels (e.g., driving wheels 38) (namely, is likely to be transmitted to the user), which may result in deterioration of the driveability. Thus, in the second embodiment, the lock-up clutch pressure $P_{LU}$ is gradually increased in accordance with the execution time of the cancellation of neutral control, and the lock-up clutch $P_{LU}$ is set so that the lock-up clutch pressure $P_{LU}$ at the time of completion of cancellation of neutral control becomes equal to a target pressure $P_{LU}^*$ determined under the start-time lock-up slip control. Alternatively, the lock-up clutch pressure $P_{LU}$ is set to the smaller one of the two lock-up clutch pressures $P_{LU}$ as explained below. One of the two lock-up clutch pressures $P_{LU}$ is set in accordance with the execution time of cancellation of neutral control. The other lock-up clutch pressure $P_{LU}$ is set so that the lock-up clutch pressure $P_{LU}$ gradually increases toward the target pressure $P_{LU}^*$, according to a predetermined unstable-condition time $t_{ON}$ associated with a transient operation of the engine 30 from the time when the accelerator pedal is depressed, namely, according to the predetermined unstable-condition time $t_{ON}$ that is obtained by experiment and set in advance as a period of time for which the engine torque $T_E$ is not stabilized in a transient condition of the engine after the accelerator pedal is depressed.

More specifically, referring back to FIG. 6, the hydraulic pressure setting unit 98 calculates a point in time at which cancellation of neutral control is completed, which corresponds to the execution time of cancellation of neutral control, based on a given rate of change $(dN_T/dt)'$ corresponding to a predetermined gradient of the turbine speed $N_T$ during cancellation of neutral control, and the transmission input rotational speed $N_{S3}$ at the time of completion of engagement of the clutch C1. Then, the hydraulic pressure setting unit 98 corrects the hydraulic pressure command value of the lock-up clutch 33 which gradually increases from the low-level standby pressure $P_{WLU}$ toward the target pressure $P_{LU}^*$ in the predetermined slip engagement pattern for normal starting as shown in FIG. 11, so that the hydraulic pressure command value reaches the target pressure $P_{LU}^*$ at the calculated point in time at which cancellation of neutral control is completed. Namely, the hydraulic pressure setting unit 98 calculates the hydraulic pressure (A) that gradually increases from the low-level standby pressure $P_{WLU}$ toward the target pressure $P_{LU}^*$ so that it reaches the target pressure $P_{LU}^*$ at the calculated point in time at which calculation of neutral control is completed, for example, and sets the hydraulic pressure (A) as the hydraulic pressure command value of the lock-up clutch 33 which gradually increases from the low-level standby pressure $P_{WLU}$ toward the target pressure $P_{LU}^*$ according to a given slip engagement pattern.

Also, the hydraulic pressure setting unit 98 calculates the hydraulic pressure (B) that gradually increases from the low-level standby pressure $P_{WLU}$ toward the target pressure $P_{LU}^*$ so that it reaches the target pressure $P_{LU}^*$ after a lapse of a predetermined unstable-condition time ton as a period of time for which the engine torque $T_E$ is not stabilized from the time when the accelerator pedal is depressed (namely, from the time when the start-time lock-up slip control is started). Then, the hydraulic pressure setting unit 98 selects the smaller hydraulic pressure (MIN) from the calculated hydraulic pressure (A) and hydraulic pressure (B), from the viewpoint of minimizing or avoiding an influence of disturbance of the engine torque $T_E$ on control immediately after depression of the accelerator pedal, and sets the selected hydraulic pressure (MIN) as the hydraulic pressure command value of the lock-up clutch 33 which gradually increases from the low-level standby pressure $P_{WLU}$ toward the target pressure $P_{LU}^*$ according to a given slip engagement pattern. Namely, the hydraulic pressure setting unit 98 corrects the hydraulic pressure command value of the lock-up clutch 33 which gradually increases from the low-level standby pressure $P_{WLU}$ toward the target pressure $P_{LU}^*$ according to the predetermined slip engagement pattern for normal starting as shown in FIG. 11 by way of example, so that the hydraulic pressure command value becomes equal to the smaller pressure (MIN) of the calculated hydraulic pressure (A) and hydraulic pressure (B). The above-mentioned unstable-condition time ton may be a predetermined fixed period of time that is obtained by experiment and set in advance as a period for which the engine torque $T_E$ is unstable immediately after depression of the accelerator pedal, or may be set as appropriate based on the current engine speed $N_E$, engine torque $T_E$, and so forth, from the relationship(s) obtained by experiment and set in advance.

No matter which of the hydraulic pressure (A) and the hydraulic pressure (B) is selected, the hydraulic pressure is set so that the gradient of the turbine speed $N_T$ that is changed, through engagement of the clutch C1, toward the transmission input rotational speed $N_{S3}$ at the time of completion of engagement of the clutch C1 is made equal to the predetermined gradient $(dN_T/dt)'$, in the same manner as in the first embodiment. Also, the hydraulic pressure is set such that the gradient of the turbine speed $N_T$ that is changed, through engagement of the clutch C1, toward the transmission input rotational speed $N_{S3}$ at the time of completion of engagement of the clutch C1 is limited by a preset gradient, in the same manner as in the first embodiment.

FIG. 16 is a flowchart of a second embodiment of the invention, illustrating a control routine executed by the electronic control unit 50, namely, a control routine for stably carrying out cancellation of neutral control and start-time lock-up slip control in an overlapping manner. The control routine of FIG. 16 is repeatedly executed at extremely short time intervals or cycle time of several milliseconds to several dozens of milliseconds. The flowchart of FIG. 16 illustrating the control routine of the second embodiment corresponds to the flowchart of FIG. 14 illustrating the control routine of the first embodiment. The control routine of FIG. 16 is started on the assumption that neutral control is being performed by the neutral control unit 88, as is the case of FIG. 14. FIG. 17 is a time chart corresponding to the control routine of FIG. 16. In the flowchart of FIG. 16, the same steps as those included in the flowchart of FIG. 14 will not be explained.

Referring to FIG. 16, in step S70' corresponding to the hydraulic pressure setting unit 98, the hydraulic pressure (A) that gradually approaches the target pressure $P_{LU}^*$ from the low-level standby pressure $P_{WLU}$ in accordance with the execution time of cancellation of neutral control is calculated. Also, the hydraulic pressure (B) that gradually approaches the target pressure $P_{LU}^*$ from the low-level standby pressure $P_{WLU}$ in accordance with a given unstable-condition time ton for which the engine torque $T_E$ is unstable in a transient condition following depression of the accelerator pedal is calculated. Then, in step S80' corresponding to the hydraulic pressure setting unit 98, the smaller hydraulic pressure (MIN) is selected from the hydraulic pressure (A) and hydraulic pressure (B) calculated in the above step S70', and the selected hydraulic pressure (MIN) is set as the hydraulic pressure command value of the lock-up clutch 33 which gradually increases from the low-level standby pressure $P_{WLU}$ toward the target pressure $P_{LU}^*$ according to a given slip engagement pattern. Namely, the hydraulic pressure command value of the lock-up clutch 33 which gradually increases from the low-level standby pressure $P_{WLU}$ toward the target pressure $P_{LU}^*$ in the predetermined slip engagement pattern for normal starting as shown in FIG. 11 is corrected so that the hydraulic pressure command value becomes equal to the smaller hydraulic pressure (MIN) of the calculated hydraulic pressure (A) and hydraulic pressure (B).

In FIG. 17, in the initial period of cancellation of neutral control, the hydraulic pressure command value of the lock-up clutch 33 is kept equal to the low-level standby pressure $P_{WLU}$ so as to suppress or reduce an influence of change in the engagement torque of the clutch C1. Then, the hydraulic pressure (A) that gradually increases from the low-level standby pressure $P_{WLU}$ toward the target pressure $P_{LU}^*$ so that it reaches the target pressure $P_{LU}^*$ at a point in time at which cancellation of neutral control is completed is set in accordance with the execution time of cancellation of neutral control. Also, the hydraulic pressure (B) that gradually increases from the low-level standby pressure $P_{WLU}$ toward the target pressure $P_{LU}^*$ so that it reaches the target pressure $P_{LU}^*$ after a lapse of a given unstable-condition time ton from depression of the accelerator pedal is calculated, and the smaller hydraulic pressure (MIN) of the hydraulic pressure (A) and the hydraulic pressure (B) is selected and set as the hydraulic pressure that gradually increases from the low-level standby pressure $P_{WLU}$ toward the target pressure $P_{LU}^*$. More specifically, in the case where the given unstable-condition time ton is an unstable-condition time tonB as indicated in FIG. 17, the hydraulic pressure (B) as indicated by a broken line in FIG. 17 is calculated, and the hydraulic pressure (A) as the smaller one of the hydraulic pressure (A) and the hydraulic pressure (B) is selected and set as the hydraulic pressure that gradually increases from the low-level standby pressure $P_{WLU}$ toward the target pressure $P_{LU}^*$. On the other hand, in the case where the given unstable-condition time ton is an unstable-condition time tonB' as indicated in FIG. 17, the hydraulic pressure (B') as indicated by a two-dot chain line in FIG. 17 is calculated, and the hydraulic pressure (B') as the smaller one of the hydraulic pressure (A) and the hydraulic pressure (B') is selected and set as the hydraulic pressure that gradually increases from the low-level standby pressure $P_{WLU}$ toward the target pressure $P_{LU}^*$.

According to the second embodiment, when the start-time lock-up slip control is additionally executed during cancellation of neutral control, the gradient of the turbine speed $N_T$ which is changed, through engagement of the clutch C1, toward the transmission input rotational speed $N_{S3}$ at the time of completion of engagement of the clutch C1 is controlled by suitably controlling the lock-up clutch pressure $P_{LU}$ that is raised so as to bring the lock-up clutch 33 into slip engagement during start-time lock-up slip control, as described above. Therefore, shock that occurs upon engagement of the clutch C1 and variations in the engine torque $T_E$ in a transient condition are less likely to be transmitted to the output side (i.e., to the driving wheels 38). Thus, the cancellation of neutral control and the start-time lock-up slip control can be respectively carried out with stability in an overlapping manner.

According to the second embodiment, the lock-up clutch pressure $P_{LU}$ is gradually increased in accordance with the execution time of cancellation of neutral control, and the lock-up clutch pressure $P_{LU}$ is set so that the pressure $P_{LU}$ reaches the target pressure $P_{LU}^*$ under start-time lock-up slip control, at the point in time at which cancellation of neutral control is completed. Thus, the lock-up clutch 33 is controlled to an appropriate slipping condition during cancellation of neutral control, and shock that occurs upon engagement of the clutch, etc. is less likely to be transmitted or prevented from being transmitted to the output side (to the driving wheels 38).

According to the second embodiment, the smaller hydraulic pressure is selected from the lock-up clutch pressure $P_{LU}$ set in accordance with the execution time of cancellation of neutral control, and the lock-up clutch pressure $P_{LU}$ that is set so as to gradually increase toward the target pressure $P_{LU}^*$ under start-time lock-up slip control according to a predetermined unstable-condition time ton measured from depression of the accelerator pedal, as a period of time for which the engine torque $T_E$ is not stabilized in a transient condition following depression of the accelerator pedal, and the selected smaller pressure is determined as the set pressure of the lock-up clutch pressure $P_{LU}$. Therefore, the lock-up clutch 33 is controlled to an appropriate slipping condition during cancellation of neutral control, and shock that occurs upon engagement of the clutch C1 and variations in the engine torque $T_E$ in a transient condition immediately after depression of the accelerator pedal, etc. are less likely or unlikely to be transmitted to the output side (to the driving wheels 38). Also, it is possible to appropriately avoid or eliminate the possibility that shock that occurs upon engagement of the clutch C1 and variations in the engine torque $T_E$ in a transient condition immediate after depression of the accelerator pedal, etc. give rise to disturbance to the start-time lock-up slip control, and the engagement control of the lock-up clutch 33 is not stably performed.

Also, according to the second embodiment, the lock-up clutch pressure $P_{LU}$ is set so that the gradient of the turbine speed $N_T$ that is changed, through engagement of the clutch C1, toward the transmission input rotational speed $N_{S3}$ at the time of completion of engagement of the clutch C1 is limited by the predetermined gradient $(dN_T/dt)'$. Therefore, when the actual engaging pressure deviates from the set pressure of the C1 clutch pressure $P_{C1}$, for example, the gradient of the turbine speed $N_T$ is prevented from being steeper than the predetermined gradient $(dN_T/dt)'$, and an increase of shock is avoided, though otherwise there is a possibility that the gradient of the turbine speed $N_T$ becomes steeper than the predetermined gradient $(dN_T/dt)'$, and the shock increases.

According to the second embodiment, the lock-up clutch pressure $P_{LU}$ is set so that the gradient of the turbine speed $N_T$ that is changed, through engagement of the clutch C1, toward the transmission input rotational speed $N_{S3}$ at the time of completion of engagement of the clutch C1 is made equal to the predetermined gradient $(dN_T/dt)'$; therefore, the neutral control can be appropriately completed in a constantly stable fixed time, for example.

While the embodiments of the invention have been described in detail with reference to the drawings, the invention may be otherwise embodied.

For example, the first embodiment and second embodiment as described above may be implemented independently of each other, or may be implemented in combination. For example, the second embodiment may be implemented on the precondition that the first embodiment is implemented.

In the illustrated embodiments, the transmission torque $T_{IN}$ transmitted to the input side of the clutch C1 may be calculated in various manners. For example, the transmission torque $T_{IN}$ may be calculated which further includes the inertia torque $T_1$ $(=I_E \times (dN_E/dt); I_E$ is the moment of inertia of an engine revolving portion (engine inertia)) applied from the engine 30 to the pump impeller 32p of the torque converter 32.

While the neutral control unit 88 executes neutral control when the shift lever 74 is placed in the "D" position in the illustrated embodiments, the neutral control may be executed when the shift lever 74 is placed in the "R" position. In this case, at least one of the brake B2 and brake B3 as engaging devices for establishing the reverse-drive gear position is brought into a slipping state or released state. The invention may be applied to the case where neutral control is executed with the shift lever 74 placed in the "R" position.

The neutral control condition determining unit 86 may determine that cancellation of neutral control is to be started, when the temperature of the clutch C1 becomes equal to or higher than a given temperature at which the durability of the clutch C1 deteriorates, or is kept at a level equal to or higher than the given temperature for a given period of time or longer. Thus, various other conditions for determining start of cancellation of neutral control may be set. In this connection, the temperature of the clutch C1 may be directly detected by a temperature sensor, or may be estimated from, for example, a difference in the rotational speed between the input and output of the clutch C1 that is in a slipping state, or the time duration for which the clutch C1 is kept slipping.

While the automatic transmission 12 is arranged to be shifted among the six forward speeds (six forward-drive gear positions) and one reverse speed (one reverse-drive gear position) in the illustrated embodiments, the number of the speeds of the automatic transmission and the internal structure thereof are not particularly limited to those of the automatic transmission 12 as described above. Namely, the invention may be applied to any type of transmission, provided that it is able to implement neutral control, and a given engaging device is adapted to be engaged when the neutral control is cancelled. Also, the invention may be applied to a continuously variable transmission, such as a belt-and-pulley type CVT (continuously variable transmission). In the case of the belt-and-pulley type CVT, for example, the invention is applied to an engaging device that is able to connect and disconnect a power transmission path between the engine and the belt-and-pulley type CVT or an engaging device provided in a known forward-drive/reverse-drive switching device, for example.

While the torque converter 32 including the lock-up clutch 33 is used as the hydraulic power transmission in the illustrated embodiments, a fluid coupling having no torque amplifying function may be used as the hydraulic power transmission.

The embodiments as described above may be combined together and implemented in order of precedence, for example.

It is to be understood that the above-described embodiments are exemplary embodiments, and that the invention may be embodied with various changes, modifications and/or improvements, based on the knowledge of those skilled in the art.

What is claimed is:

1. A start control device of a power transmission system for a vehicle including a lock-up clutch capable of directly coupling input and output members of a hydraulic power transmission that transmits power of an engine to an automatic transmission, and a start clutch that transmits the power of the engine toward driving wheels when placed in an engaged state, comprising:

a controller that performs start-time lock-up slip control for bringing the lock-up clutch into slip engagement when the vehicle is started, and performs neutral control for placing the start clutch in at least one of a slipping state and a released state when the vehicle is stopped so as to bring a power transmission path between the engine and the driving wheels into a restricted power transmitting condition, wherein when the start-time lock-up slip control is additionally executed during cancellation of the neutral control, the controller controls a gradient of an output rotational speed of the hydraulic power transmission which is changed, through engagement of the start clutch, toward an input rotational speed of the automatic transmission at the time of completion of engagement of the start clutch, using at least one of a start clutch pressure that is increased so as to engage the start clutch, and a lock-up clutch pressure that is increased so as to bring the lock-up clutch into slip engagement.

2. The start control device according to claim 1, wherein the controller calculates a variation in torque transmitted to the start clutch, based on engine torque and the lock-up clutch pressure, and sets the start clutch pressure according to the variation in the torque.

3. The start control device according to claim 2, wherein the controller corrects a set pressure of the start clutch pressure, which is set in advance for cancelling the neutral control without involving the start-time lock-up slip control, according to the variation in the torque transmitted to the start clutch.

4. The start control device according to claim 1, wherein the controller sets the lock-up clutch pressure so that the lock-up clutch pressure gradually increases in accordance with an execution time of cancellation of the neutral control, and reaches a target pressure under the start-time lock-up slip control at a point in time at which cancellation of the neutral control is completed.

5. The start control device according to claim 4, wherein the controller selects a smaller pressure from the lock-up clutch pressure that is set in accordance with the execution time of cancellation of the neutral control, and the lock-up clutch pressure that is set so as to gradually increase toward the target pressure under the start-time lock-up slip control according to a predetermined period of time associated with a transient operation of the engine starting from depression of an accelerator pedal, and sets the smaller pressure as a set pressure of the lock-up clutch pressure.

6. The start control device according to claim 1, wherein the controller sets at least one of the start clutch pressure and the lock-up clutch pressure, such that the gradient of the output rotational speed of the hydraulic power transmission which is changed, through engagement of the start clutch, toward the input rotational speed of the automatic transmission at the time of completion of engagement of the start clutch is limited by a predetermined gradient.

7. The start control device according to claim 1, wherein the controller sets at least one of the start clutch pressure and the lock-up clutch pressure, such that the gradient of the output rotational speed of the hydraulic power transmission which is changed, through engagement of the start clutch, toward the input rotational speed of the automatic transmission at the time of completion of engagement of the start clutch is made substantially equal to a predetermined gradient.

8. A start control method of a power transmission system for a vehicle including a lock-up clutch capable of directly coupling input and output members of a hydraulic power transmission that transmits power of an engine to an automatic transmission, and a start clutch that transmits the power of the engine toward driving wheels when placed in an engaged state, comprising:
    performing start-time lock-up slip control for bringing the lock-up clutch into slip engagement when the vehicle is started, and performing neutral control for placing the start clutch in at least one of a slipping state and a released state when the vehicle is stopped so as to bring a power transmission path between the engine and the driving wheels into a restricted power transmitting condition; and
    when the start-time lock-up slip control is additionally executed during cancellation of the neutral control, controlling a gradient of an output rotational speed of the hydraulic power transmission which is changed, through engagement of the start clutch, toward an input rotational speed of the automatic transmission at the time of completion of engagement of the start clutch, using at least one of a start clutch pressure that is increased so as to engage the start clutch, and a lock-up clutch pressure that is increased so as to bring the lock-up clutch into slip engagement.

9. The start control method according to claim 8, wherein a variation in torque transmitted to the start clutch is calculated based on engine torque and the lock-up clutch pressure, and the start clutch pressure is set according to the variation in the torque.

10. The start control method according to claim 9, wherein a set pressure of the start clutch pressure, which is set in advance for cancelling the neutral control without involving the start-time lock-up slip control, is corrected according to the variation in the torque transmitted to the start clutch.

11. The start control method according to claim 8, wherein the lock-up clutch pressure is set so that the lock-up clutch pressure gradually increases in accordance with an execution time of cancellation of the neutral control, and reaches a target pressure under the start-time lock-up slip control at a point in time at which cancellation of the neutral control is completed.

12. The start control method according to claim 11, wherein
    a smaller pressure is selected from the lock-up clutch pressure that is set in accordance with the execution time of cancellation of the neutral control, and the lock-up clutch pressure that is set so as to gradually increase toward the target pressure under the start-time lock-up slip control according to a predetermined period of time associated with a transient operation of the engine starting from depression of an accelerator pedal, and the smaller pressure is set as a set pressure of the lock-up clutch pressure.

13. The start control method according to claim 8, wherein at least one of the start clutch pressure and the lock-up clutch pressure is set such that the gradient of the output rotational speed of the hydraulic power transmission which is changed, through engagement of the start clutch, toward the input rotational speed of the automatic transmission at the time of completion of engagement of the start clutch is limited by a predetermined gradient.

14. The start control method according to claim 8, wherein at least one of the start clutch pressure and the lock-up clutch pressure is set such that the gradient of the output rotational speed of the hydraulic power transmission which is changed, through engagement of the start clutch, toward the input rotational speed of the automatic transmission at the time of completion of engagement of the start clutch is made substantially equal to a predetermined gradient.

* * * * *